United States Patent
Omari et al.

(10) Patent No.: US 12,063,439 B2
(45) Date of Patent: *Aug. 13, 2024

(54) COMBINED MECHANICAL AND ELECTRONIC IMAGE STABILIZATION

(71) Applicant: GoPro, Inc., San Mateo, CA (US)

(72) Inventors: Sammy Omari, Zurich (CH); Pascal Gohl, Winterthur (CH); Joseph A. Enke, Campbell, CA (US); Stepan Moskovchenko, Belmont, CA (US); Benjamin P. Tankersley, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,275

(22) Filed: Nov. 7, 2022

(65) Prior Publication Data
US 2023/0059888 A1 Feb. 23, 2023

Related U.S. Application Data

(63) Continuation of application No. 15/837,263, filed on Dec. 11, 2017, now Pat. No. 11,496,684.

(51) Int. Cl.
*H04N 23/68* (2023.01)
*G03B 17/56* (2021.01)
*H04N 23/55* (2023.01)

(52) U.S. Cl.
CPC ....... *H04N 23/6811* (2023.01); *G03B 17/561* (2013.01); *H04N 23/6812* (2023.01);
(Continued)

(58) Field of Classification Search
CPC .......... H04N 5/23254; H04N 5/23267; H04N 5/2328; H04N 5/23258; H04N 5/2254
(Continued)

(56) References Cited

U.S. PATENT DOCUMENTS 5,469,209 A * 11/1995 Gunday ............... H04N 5/14
348/E7.015
5,548,327 A 8/1996 Gunday
(Continued)

FOREIGN PATENT DOCUMENTS

CN 101370128 A 2/2009
CN 101872196 A 10/2010
(Continued)

OTHER PUBLICATIONS

DJI Inspire 1 User Manual, V2.2, 2017 (Year: 2017) (64 pages).
(Continued)

*Primary Examiner* — Lin Ye
*Assistant Examiner* — Chan T Nguyen
(74) *Attorney, Agent, or Firm* — Young Basile Hanlon & MacFarlane, P.C.

(57) ABSTRACT

Systems and methods are disclosed for image signal processing. For example, methods may include, based on a sequence of orientation estimates for an image sensor and an orientation setpoint, invoking a mechanical stabilization system to adjust an orientation of the image sensor toward the orientation setpoint; receiving an image from the image sensor; determining an orientation error between the orientation of the image sensor and the orientation setpoint during capture of the image; and, based on the orientation error, invoking an electronic image stabilization module to correct the image for a rotation corresponding to the orientation error to obtain a stabilized image.

20 Claims, 8 Drawing Sheets

(52) U.S. Cl.
CPC ......... *H04N 23/683* (2023.01); *H04N 23/685* (2023.01); *H04N 23/687* (2023.01); *H04N 23/55* (2023.01)

(58) Field of Classification Search
USPC .................................................... 348/208.99
See application file for complete search history.

(56) References Cited

U.S. PATENT DOCUMENTS

| | | | |
|---|---|---|---|
| 7,643,063 | B2 | 1/2010 | Trescott |
| 7,932,925 | B2 | 4/2011 | Inbar |
| 8,861,947 | B2 | 10/2014 | Webb |
| 8,908,090 | B2 | 12/2014 | Webb |
| 9,143,686 | B2 | 9/2015 | Lee |
| 9,144,714 | B2 | 9/2015 | Hollinger |
| 9,239,468 | B2 | 1/2016 | Webb |
| 9,277,130 | B2 | 3/2016 | Wang |
| 9,360,740 | B2 | 6/2016 | Wagner |
| 9,436,181 | B2 | 9/2016 | Peeters |
| 9,574,703 | B2 | 2/2017 | Firchau |
| 9,692,972 | B2 | 6/2017 | Karpenko |
| 9,777,887 | B2 | 10/2017 | Pan |
| 9,859,938 | B2 | 1/2018 | Piccioni |
| 9,863,171 | B1 | 1/2018 | Salter |
| 9,874,308 | B2 | 1/2018 | Saika |
| 10,008,028 | B2 | 6/2018 | Zuccarino |
| 10,129,478 | B2 | 11/2018 | Zhao |
| 10,150,576 | B2 | 12/2018 | Saika |
| 10,274,127 | B2 | 4/2019 | Wei |
| 10,735,653 | B1 | 8/2020 | Huang |
| 10,827,123 | B1 | 11/2020 | Flanigan |
| 11,496,684 | B2 | 11/2022 | Omari |
| 2001/0013890 | A1 | 8/2001 | Narayanaswami |
| 2005/0243173 | A1 | 11/2005 | Levine |
| 2009/0219402 | A1 | 9/2009 | Schneider |
| 2011/0221900 | A1 | 9/2011 | Reich |
| 2012/0180789 | A1 | 7/2012 | Tobia |
| 2012/0268614 | A1 | 10/2012 | Webb |
| 2013/0088610 | A1 | 4/2013 | Lee |
| 2013/0210563 | A1 | 8/2013 | Hollinger |
| 2014/0024999 | A1 | 1/2014 | Levien |
| 2014/0263823 | A1 | 9/2014 | Wang |
| 2014/0368911 | A1 | 12/2014 | Becker |
| 2015/0085149 | A1 | 3/2015 | Tsubaki |
| 2015/0094883 | A1 | 4/2015 | Peeters |
| 2015/0097950 | A1 | 4/2015 | Wang |
| 2015/0149000 | A1 | 5/2015 | Rischmuller |
| 2015/0304652 | A1 | 10/2015 | Spas |
| 2015/0350543 | A1 | 12/2015 | Hollinger |
| 2015/0381891 | A1* | 12/2015 | Karpenko ............ H04N 23/682 348/208.99 |
| 2016/0033077 | A1 | 2/2016 | Chen |
| 2016/0057353 | A1* | 2/2016 | Tuulos ................. H04N 23/687 348/208.99 |
| 2016/0201847 | A1 | 7/2016 | Firchau |
| 2016/0344935 | A1* | 11/2016 | Ardö ...................... H04N 25/61 |
| 2016/0352992 | A1 | 12/2016 | Saika |
| 2016/0360111 | A1 | 12/2016 | Thivent |
| 2017/0041652 | A1 | 2/2017 | Ko |
| 2017/0064176 | A1 | 3/2017 | Kim |
| 2017/0134631 | A1 | 5/2017 | Zhao |
| 2017/0143442 | A1 | 5/2017 | Tesar |
| 2017/0178392 | A1 | 6/2017 | Zuccarino |
| 2017/0222676 | A1 | 8/2017 | Piccioni |
| 2017/0227162 | A1 | 8/2017 | Saika |
| 2017/0307334 | A1* | 10/2017 | Greenwood .......... F41G 7/2293 |
| 2017/0358141 | A1 | 12/2017 | Stafford |
| 2018/0025498 | A1 | 1/2018 | Omari |
| 2018/0079529 | A1 | 3/2018 | Saika |
| 2018/0093638 | A1 | 4/2018 | Piccioni |
| 2018/0194488 | A1 | 7/2018 | Zhao |
| 2018/0255247 | A1* | 9/2018 | Ristroph ................ H04N 23/55 |
| 2018/0321328 | A1 | 11/2018 | Kushleyev |
| 2018/0352144 | A1 | 12/2018 | Miao |
| 2019/0008256 | A1 | 1/2019 | Basham |
| 2019/0182424 | A1 | 6/2019 | Omari |

FOREIGN PATENT DOCUMENTS

| | | |
|---|---|---|
| CN | 102355574 A | 2/2012 |
| CN | 103064430 A | 4/2013 |
| EP | 3139239 A1 | 3/2017 |
| JP | 2002051118 A | 2/2002 |
| WO | 0235824 A1 | 5/2002 |
| WO | WO2018027340 * | 6/2016 |
| WO | 2017035840 A1 | 3/2017 |
| WO | 2018027340 | 2/2018 |

OTHER PUBLICATIONS

Film Like a Pro: DJI Drone "ActiveTrack"—With Video Tutorials, DJI, Dec. 18, 2017, https://store.dji.com/guides/ film-like-a-pro-with-activetrack/ (Year: 2017) (12 pages).

International Search Report and Written Opinion for Application No. PCT/US 2019/012253, date of mailing Mar. 25, 2019, 14 pages.

Karma Grip Let's Get Started retrieved on Feb. 21, 2018 from URL https://gopro.com/content/dam/help/karma/karma-grip-quick-start-guides/Karma-Grip_QSG_HERO5_ENG_REVA.pdf (7 pages).

Osmo—Reimagine Movement—DJI retrieved on Feb. 21, 2018 from URL https://www.dji.com/osmo (11 pages).

Rick Miller et al.: "Gimbal system configurations and line-of-sight control techniques for small UAV applications", Proceedings of SPIE, vol. 8713, May 31, 2013 (May 31, 2013), p. 871308, XP044347865, US DOI: 10.1117/12.2015777, ISBN: 978-1-5106-1533-5.

U.S. Appl. No. 15/892,077, filed Feb. 8, 2018, Flanigan et al., 57 pages.

U.S. Appl. No. 15/934,204, filed Mar. 23, 2018, Enke et al., 81 pages.

YI Action Gimbal | YI Technology retrieved on Feb. 21, 2018 from URL https://www.yitechnology.com/yi-action-gimbal (18 pages).

* cited by examiner

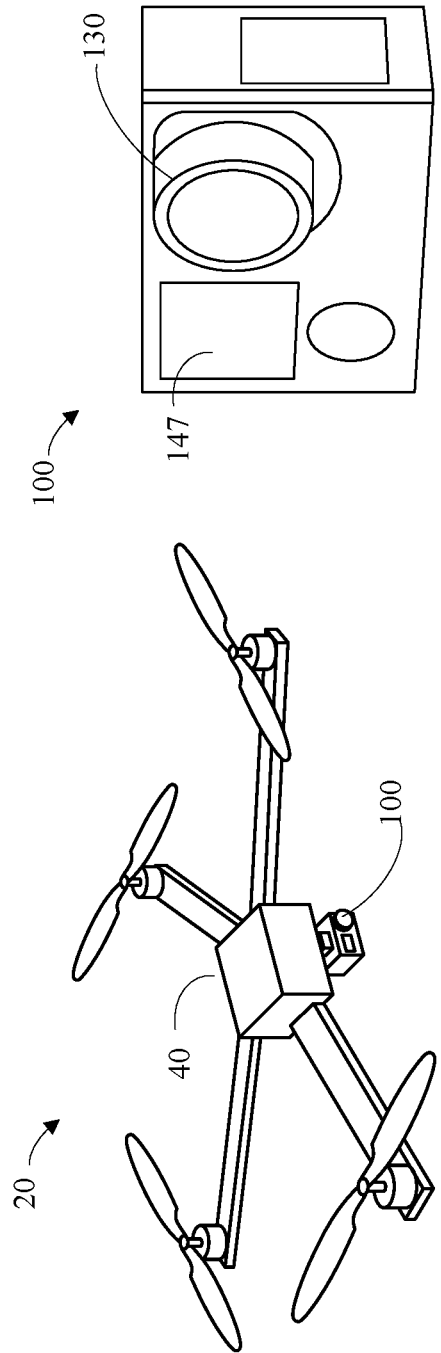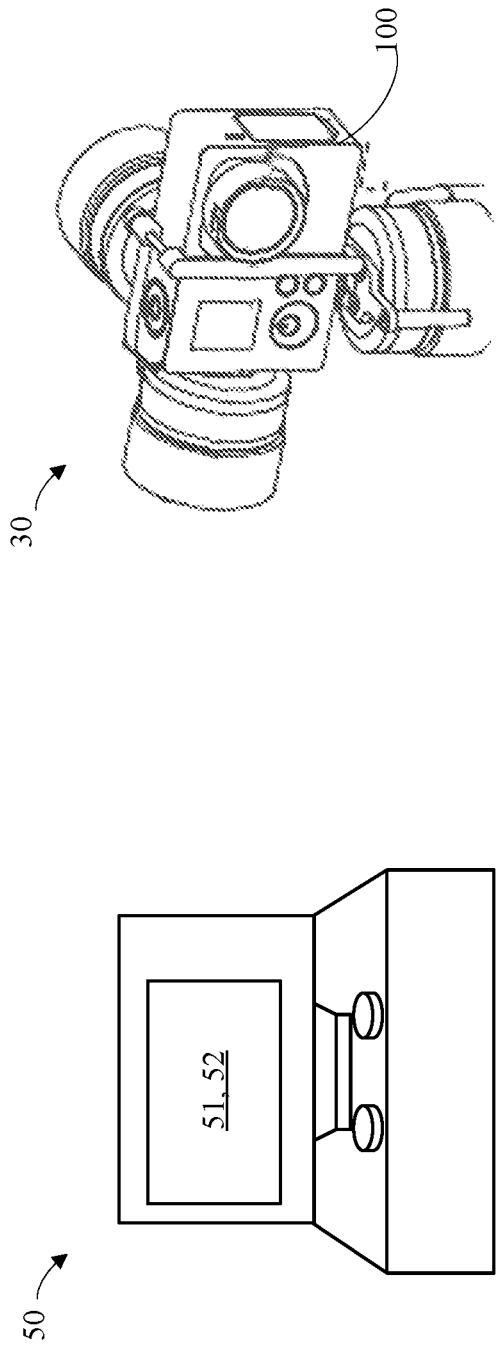

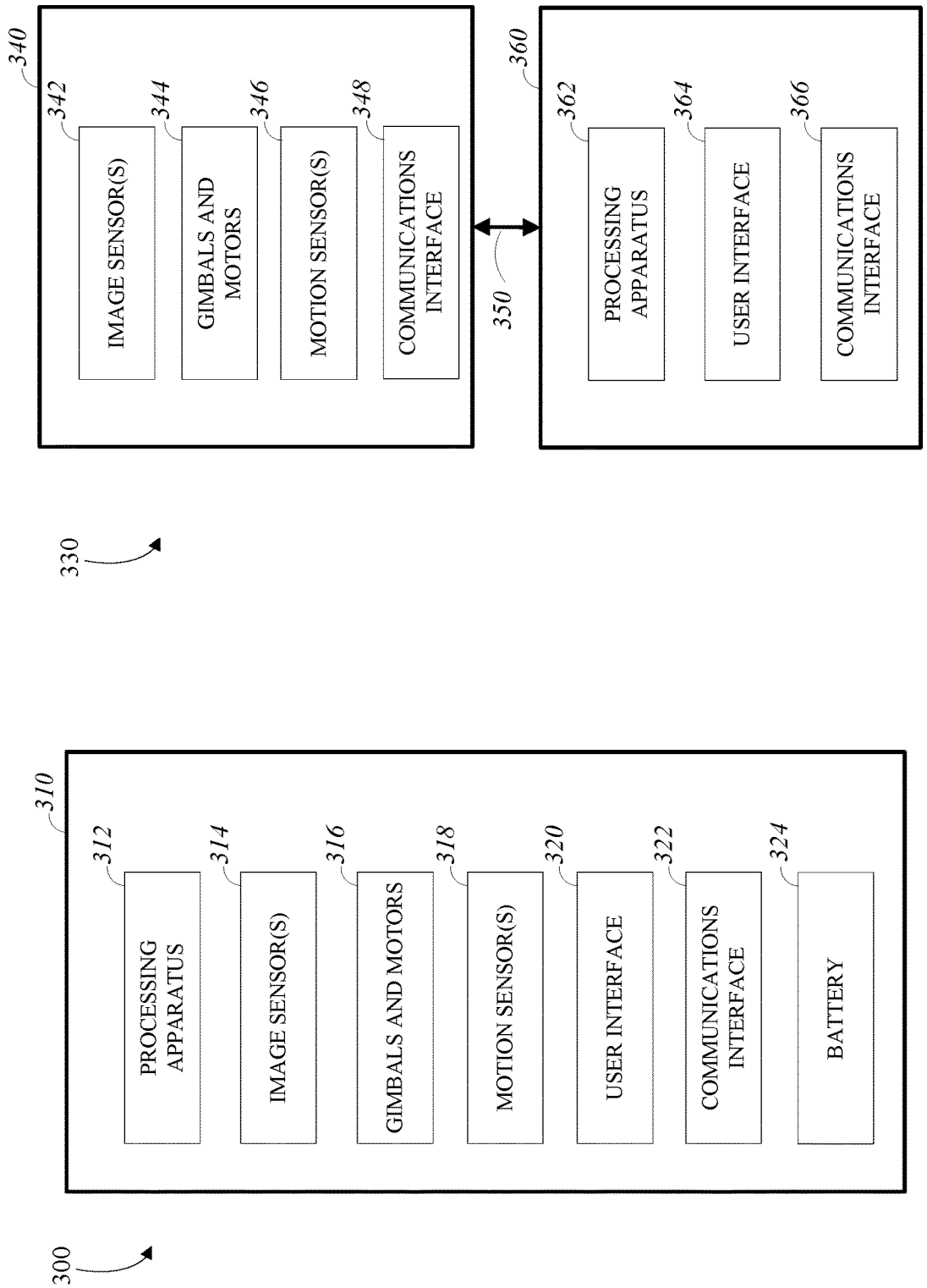

COMBINED MECHANICAL AND ELECTRONIC IMAGE STABILIZATION

CROSS REFERENCE TO RELATED APPLICATION(S)

This application is a continuation of U.S. patent application Ser. No. 15/837,263, filed Dec. 11, 2017, the disclosure of which is hereby incorporated by reference in its entirety.

TECHNICAL FIELD

This disclosure relates to image stabilization for image capture.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be stored and/or encoded. In some implementations, multiple images or video frames from different image sensors may include spatially adjacent or overlapping content, which may be stitched together to form a larger image with a larger field of view.

SUMMARY

Disclosed herein are implementations of image stabilization for image capture.

In a first aspect, the subject matter described in this specification can be embodied in systems that include an image sensor configured to capture an image; a mechanical stabilization system, including motors, configured to control an orientation of the image sensor to match an orientation setpoint; and an electronic image stabilization module configured to correct the image for a rotation of the image sensor corresponding to orientation errors between the orientation of the image sensor and the orientation setpoint during capture of the image.

In a second aspect, the subject matter described in this specification can be embodied in methods that include determining an orientation setpoint for an image sensor; based on a sequence of orientation estimates for the image sensor and the orientation setpoint, invoking a mechanical stabilization system to adjust an orientation of the image sensor toward the orientation setpoint; receiving an image from the image sensor; determining an orientation error between the orientation of the image sensor and the orientation setpoint during capture of the image; based on the orientation error, invoking an electronic image stabilization module to correct the image for a rotation corresponding to the orientation error to obtain a stabilized image; and storing, displaying, or transmitting an output image based on the stabilized image.

In a third aspect, the subject matter described in this specification can be embodied in systems that include an image sensor configured to capture an image, one or more motion sensors configured to detect motion of the image sensor, a mechanical stabilization system, including gimbals and motors, configured to control an orientation of the image sensor, an electronic image stabilization module configured to correct images for rotations of the image sensor, and a processing apparatus that is configured to: determine a sequence of orientation estimates based on sensor data from the one or more motion sensors; determine an orientation setpoint for the image sensor; based on the sequence of orientation estimates and the orientation setpoint, invoke the mechanical stabilization system to adjust the orientation of the image sensor; receive the image from the image sensor; determine an orientation error between the orientation of the image sensor and the orientation setpoint during capture of the image; based on the orientation error, invoke the electronic image stabilization module to correct the image for a rotation corresponding to the orientation error to obtain a stabilized image; and store, display, or transmit an output image based on the stabilized image.

In a fourth aspect, the subject matter described in this specification can be embodied in systems that include an image sensor, one or more motion sensors configured to detect motion of the image sensor, a mechanical stabilization system configured to control an orientation of the image sensor, an electronic image stabilization module configured to correct images for rotations of the image sensor, and a processing apparatus that is configured to: based on sensor data from the one or more motion sensors and an orientation setpoint for the image sensor, invoke the mechanical stabilization system to adjust the orientation of the image sensor; receive an image from the image sensor; determine an orientation error between the orientation of the image sensor and the orientation setpoint during capture of the image; and, based on the orientation error, invoke the electronic image stabilization module to correct the image for a rotation corresponding to the orientation error to obtain a stabilized image.

In a fifth aspect, the subject matter described in this specification can be embodied in methods that include, based on a sequence of orientation estimates for an image sensor and an orientation setpoint, invoking a mechanical stabilization system to adjust an orientation of the image sensor toward the orientation setpoint; receiving an image from the image sensor; determining an orientation error between the orientation of the image sensor and the orientation setpoint during capture of the image; and, based on the orientation error, invoking an electronic image stabilization module to correct the image for a rotation corresponding to the orientation error to obtain a stabilized image.

In a sixth aspect, the subject matter described in this specification can be embodied in systems that include an image sensor configured to capture an image; a mechanical stabilization system configured to control an orientation of the image sensor to match an orientation setpoint; an electronic image stabilization module configured to correct the image for a rotation of the image sensor corresponding to orientation errors between the orientation of the image sensor and the orientation setpoint during capture of the image; and a drone that is coupled to a housing of the image sensor by the mechanical stabilization system.

These and other aspects of the present disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 2A is a pictorial illustration of a movable imaging assembly.

FIG. 2B is a pictorial illustration of the imaging device.

FIG. 2C is a pictorial illustration of a movable imaging assembly controller and user interface.

FIG. 2D is a pictorial illustration of the imaging device of FIG. 2B within a movement mechanism.

FIG. 3A is a block diagram of an example of a system configured for image capture with image stabilization.

FIG. 3B is a block diagram of an example of a system configured for image capture with image stabilization.

DETAILED DESCRIPTION

Figure 1:
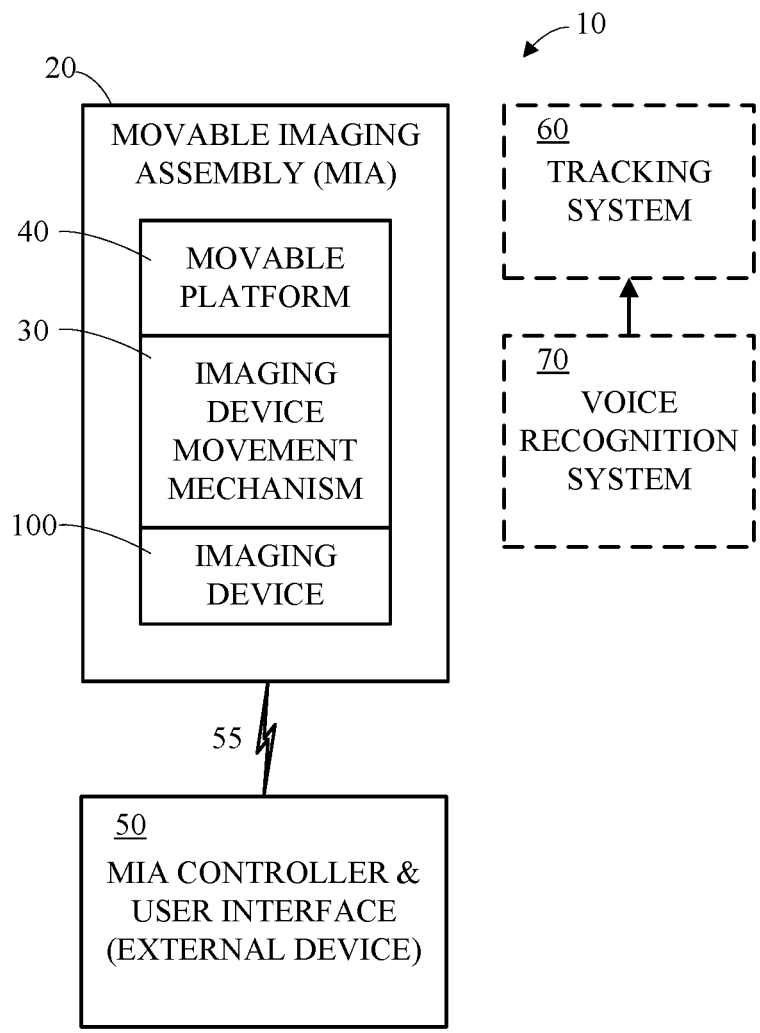
FIG. 1 is a block diagram of a movable imaging system and high-level components.

This document includes disclosure of systems, apparatus, and methods for image capture with combined mechanical and electronic image stabilization. Electronic image stabilization (EIS) and mechanical stabilization systems (MSS) attempt to solve the same problem using similar data. Typical implementations do not operate properly at the same time. Typical electronic image stabilization modules may use gyroscope data to correct for camera rotational motion around the X, Y, and Z axes of the camera frame. Typical mechanical stabilization systems may use gyroscope and/or accelerometer data as well as optionally magnetometer, barometer, and global positioning system data to reject roll motion in the X, Y, and Z axes of a gimbal frame as well as translational motion in the X, Y, and Z axes in the gimbal frame. A mechanical stabilization system may be configured to reject motion while an electronic image stabilization module corrects motion artifacts in a captured image (e.g., a frame of video). A mechanical stabilization system works in the gimbal frame of reference (which may be different for each axis) while an electronic image stabilization module works on the camera frame of reference.

Mechanical image stabilization usually relies on having high-torque, high-bandwidth motors to ensure that the orientation of the stabilized camera follows the desired orientation accurately. There are several drawbacks of this approach. First, motors have inherent limitations in terms of control bandwidth. For example, the motors may be limited in their capability to reject high-frequency vibrations that may be visible on the camera (e.g., jitter or jello artifacts). Second, motors have inherent limitations in terms of maximum torque. For example, a mechanical stabilization system may be limited in its capability to reject high-torque disturbances (e.g. a strong bump at landing after a jump). Third, maximizing control bandwidth and torque can result in heavy, expensive, and large motors if we can only rely on mechanical stabilization.

Instead of only relying on mechanical stabilization, electronic image stabilization (EIS) methods and electronic rolling shutter (ERS) compensation may also be employed. ERS is designed to remove rolling shutter artifacts (e.g., caused by very high frequency motions). EIS is designed to smooth the footage by removing a part of the high-frequency rotational motion of the camera. When applying EIS and ERS directly to mechanically stabilized footage, it can actually render the results worse. This may be because the ERS and EIS logic, which attempts to stabilize the image, does not have the goal to stabilize it to the same orientation. In fact, the criteria at which the desired ERS/EIS correction is selected is usually not in line with the mechanical gimbal stabilization criteria. For example, mechanical stabilization systems typically work within a specific region, and when the user moves the device (e.g., a slow pan), the mechanical stabilization system will follow in a smooth way. This can be interpreted as unintentional motion by the EIS system. The result can be choppy motion in the sequence of images (e.g., frames of video) output at the end of an image capture and processing pipeline.

Using both a mechanical stabilization system and an electronic image stabilization module simultaneously in the same image capture system may lead to interference between the dynamics of the two systems, which may actually degrade image (e.g., video) quality. Another problem is that a mechanical stabilization system may require high power consumption and drain a battery of an image capture system. Another problem is that an electronic image stabilization module may be computationally complex and consume significant computing resources (e.g., processor cycles or memory). Another problem is that a mechanical stabilization system typically has motors that can overheat when too much power is consumed.

A technique is proposed in which, instead of running mechanical stabilization independently and in parallel with EIS and/or ERS, a sequential approach is used where the stabilization criteria of the mechanical and electrical stabilization are aligned. The underlying idea is to have a trajectory generator that provides an orientation setpoint (e.g., a desired orientation) for the camera. The mechanical stabilization system tries to reach the orientation setpoint. The error between orientation setpoint and actual orientation of the camera during capture of an image or a portion of an image can be estimated and then be compensated for by an electronic image stabilization module. For systems using an electronic rolling shutter, orientation errors can be determined for respective portions of an image (e.g., lines or rows of pixels) and then a warp mapping may be computed and applied to an image to implement the EIS and ERS compensation that takes into account the portion-by-portion (e.g., line-by-line) orientation error. By feeding the orientation setpoint and/or the orientation error(s) for an image forward to the electronic image stabilization module from the mechanical stabilization system, the electronic image stabilization module may be enabled to use this data to ignore desired/intentional motion while correcting unintentional motion and error. The result may be perceived in the resulting sequence of images as smooth motion that is intended.

In some implementations, a trajectory generator only has access to current and past data but no future data. An improved camera trajectory for EIS compensation may be determined by taking into account the future camera motion (i.e., information about motion during capture of later images in a sequence of images) by introducing some algorithmic processing delay. Images and the corresponding orientation estimates and/or orientation errors for a sequence of images may be stored in a buffer to await EIS processing in a delayed fashion. This buffering may enable consideration of all the orientations of the images in the buffer when determining a trajectory (e.g., a sequence of EIS rotations) for the electronic image stabilization module (e.g., by a fast trajectory generator). The output of a fast trajectory generator that considers orientation data from the buffer may then be applied to the oldest image in the buffer to determine a stabilized image subject to the buffer delay. This is process may be repeated for new images.

The proposed techniques and systems for combining a mechanical stabilization system and an electronic image stabilization module may offer advantages over conventional image stabilization systems. For example, the quality of the stabilized images may be improved, the power consumption of a mechanical stabilization system may be reduced for a given image quality, the consumption of computational resources in an image capture system may be reduced, and/or overheating of motors in a mechanical stabilization system may be avoided or reduced.

Implementations are described in detail with reference to the drawings, which are provided as examples to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIG. 1 is a block diagram of a movable imaging system 10 and high-level components. The movable imaging system 10 may have two primary components: a movable imaging assembly 20 (MIA) and an external device 50, such as an MIA controller with a user interface. These components may be communicatively connected via a link 55. The link 55 may be wireless or wired. Other components may also be included within the movable imaging system 10. For example, the movable imaging assembly 20 may comprise an imaging device 100, such as a camera (as used herein, the term "camera" is defined broadly to include any form of imaging device) that can be used to capture still and video images. The movable imaging assembly 20 may include a movable platform 40 that can be moved positionally and/or rotationally with respect to a fixed reference ground. The movable imaging assembly 20 may also include a movement mechanism 30 that allows the imaging device 100 to move positionally and/or rotationally with respect to the movable platform 40.

In some implementations, the external device 50 may correspond to a smartphone, a tablet computer, a phablet, a smart watch, a portable computer, and/or another device configured to receive user input and communicate information with the imaging device 100, movement mechanism 30, and/or movable platform 40 individually, or with the movable imaging assembly 20 as a whole.

In one or more implementations, the link 55 may utilize any wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, the link 55 may be effectuated using a wired interface, e.g., HDMI, USB, digital video interface, display port interface (e.g., digital display interface developed by the Video Electronics Standards Association (VESA), Ethernet, Thunderbolt), and/or other interface.

The UI of the external device 50 may operate a software application (e.g., GoPro Studio®, GoPro App®, and/or other application) configured to perform a variety of operations related to camera configuration, control of video acquisition, and/or display of video captured by the imaging device 100. An application (e.g., GoPro App)® may enable a user to create short video clips and share video clips to a cloud service (e.g., Instagram®, Facebook®, YouTube®, Dropbox®); perform full remote control of imaging device 100 functions; live preview video being captured for shot framing; mark key moments while recording (e.g., HiLight Tag®, View HiLight Tags in GoPro Camera Roll®) for location and/or playback of video highlights; wirelessly control camera software; and/or perform other functions. Various methodologies may be utilized for configuring the imaging device 100 and/or displaying the captured information.

By way of an illustration, the UI of the external device 50 may receive a user setting characterizing image resolution (e.g., 3840 pixels by 2160 pixels), frame rate (e.g., 60 frames per second (fps)), and/or other settings (e.g., location) related to an activity (e.g., mountain biking) being captured by the user. The UI of the external device 50 may communicate these settings to the imaging device 100 via the link 55.

A user may utilize the UI of the external device 50 to view content acquired by the imaging device 100. A display of the UI of the external device 50 may act as a viewport into a 3D space of the content. In some implementations, the UI of the external device 50 may communicate additional information (e.g., metadata) to the imaging device 100. By way of an illustration, the UI of the external device 50 may provide orientation of the UI of the external device 50 with respect to a given coordinate system to the imaging device 100 to enable determination of a viewport location or dimensions for viewing of a portion of the panoramic content, or both. By way of an illustration, a user may rotate (sweep) the UI of the external device 50 through an arc in space. The UI of the external device 50 may communicate display orientation information to the imaging device 100 using a communication interface such as link 55. The imaging device 100 may provide an encoded bitstream configured to enable viewing of a portion of the content corresponding to a portion of the environment of the display location as the imaging device 100 traverses the path. Accordingly, display orientation information sent from the UI of the external device 50 to the imaging device 100 allows user selectable viewing of captured image and/or video.

In many instances, it is desirable to track a target (which may include one or more subjects) with the movable imaging assembly 20. Various forms of tracking may be utilized, including those discussed below and in U.S. Provisional patent application Ser. No. 62/364,960, filed Jul. 21, 2016, and herein incorporated by reference in its entirety. A tracking system 60 may be utilized to implement the described forms of tracking. The tracking system 60 may comprise a processor and algorithms that are used for tracking the target. The tracking system 60 is shown in dashed lines since it may be included entirely within the movable imaging assembly 20 or entirely within the external device 50, or portions of the tracking system 60 may be located or duplicated within each of the movable imaging assembly 20 and the external device 50. A voice recognition system 70 may also be utilized to interact with the tracking system 60 and issue commands (e.g., commands identifying or adjusting a target).

FIGS. 2A-2D are pictorial illustrations of implementations of the components shown in FIG. 1.

FIG. 2A is a pictorial illustration of the movable imaging assembly 20. In the example implementation shown, the movable imaging assembly 20 includes a movable platform 40 that is a quadcopter drone. The movable imaging assembly 20 could be any form of an aerial vehicle or any form of movable device that is movable with respect to a fixed ground, which could include movable mechanical systems that are tied to the earth. As shown in FIG. 2A, the imaging device 100 is mounted in the front of the movable platform 40 so that it points in a direction along an axis of the movable platform 40. However, in various implementations, the mounting of the imaging device 100 to the movable platform 40 is done using the movement mechanism 30.

FIG. 2B is a pictorial illustration of the imaging device 100. In FIG. 2B, the imaging device 100 is a GoPro Hero4® camera, however any type of imaging device 100 may be utilized. The imaging device 100 may include a video camera device. FIG. 2B also shows a lens 130 of the camera, along with a display screen 147.

FIG. 2C is a pictorial illustration of an external device 50, specifically, an MIA controller and user interface. The user interface may further comprise a display system 51 with a display device 52. The MIA controller may further comprise a communications interface via which it may receive commands both for operation of the movable platform 40, such as the UAV or drone, and operation of the imaging device 100. The commands can include movement commands, configuration commands, and other types of operational control commands.

FIG. 2D is a pictorial illustration of the imaging device 100 of FIG. 2B within the movement mechanism 30. The movement mechanism 30 couples the imaging device 100 to the movable platform 40. The implementation of the movement mechanism 30 shown in FIG. 2D is a three-axis gimbal mechanism that permits the imaging device 100 to be rotated about three independent axes. However, the movement mechanism 30 may include any type of translational and/or rotational elements that permit rotational and/or translational movement in one, two, or three dimensions.

FIG. 3A is a block diagram of an example of a system 300 configured for image capture with image stabilization. The system 300 includes an image capture device 310 (e.g., a camera or a drone) that includes a processing apparatus 312 that is configured to receive images from one or more image sensors 314. The image capture device 310 includes gimbals and motors 316 that are actuators of a mechanical stabilization system configured to control an orientation of the one or more image sensors 314 (e.g., an orientation with respect to a movable platform). The gimbals and motors 316 may be controlled by a controller of the mechanical stabilization system, which may be implemented by the processing apparatus 312 (e.g., as a software module or a specialized hardware module). The processing apparatus 312 may be configured to perform image signal processing (e.g., filtering, tone mapping, stitching, and/or encoding) to generate output images based on image data from the image sensor 314. The processing apparatus 312 may include an electronic image stabilization module (e.g., implemented as a software module or a specialized hardware module) configured to correct images for rotations of the one or more image sensors 314. The image capture device 310 includes one or more motion sensors 318 configured to detect motion of the one or more image sensors 314. The one or more motion sensors 318 may provide feedback signals to the mechanical stabilization system and/or electronic image stabilization module. The image capture device 310 includes a communications interface 322 for transferring images to other devices. The image capture device 310 includes a user interface 320, which may allow a user to control image capture functions and/or view images. The image capture device 310 includes a battery 324 for powering the image capture device 310. For example, the system 300 may be used to implement processes described in this disclosure, such as the process 600 of FIG. 6 and the process 700 of FIG. 7.

The processing apparatus 312 may include one or more processors having single or multiple processing cores. The processing apparatus 312 may include memory, such as random access memory device (RAM), flash memory, or any other suitable type of storage device such as a non-transitory computer readable memory. The memory of the processing apparatus 312 may include executable instructions and data that can be accessed by one or more processors of the processing apparatus 312. For example, the processing apparatus 312 may include one or more DRAM modules such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor. In some implementations, the processing apparatus 312 may have multiple processing units in different portions the image capture device 310. For example, the processing apparatus 312 may include a processor on a movable platform (e.g., the movable platform 40) and a processor in an imaging device (e.g., the imaging device 100) that are connected by the gimbals and motors 316.

The processing apparatus 312 may include an electronic image stabilization module configured to correct images for rotations of an image sensor. For example, the electronic image stabilization module may implemented by software executed by the processing apparatus 312. The electronic image stabilization module may take sensor data (e.g., gyroscope data) and/or orientation estimates for the image sensor as input, determine a corrective rotation, and apply the corrective rotation to an image from the image sensor to obtain a stabilized image.

The one or more image sensors 314 are configured to capture images. The one or more image sensors 314 are configured to detect light of a certain spectrum (e.g., the visible spectrum or the infrared spectrum) and convey information constituting an image as electrical signals (e.g., analog or digital signals). For example, the one or more image sensors 314 may include charge-coupled devices (CCD) or active pixel sensors in complementary metal-oxide-semiconductor (CMOS). The one or more image sensors 314 may detect light incident through respective lens (e.g., a fisheye lens). In some implementations, the one or more image sensors 314 include digital to analog converters. In some implementations, the one or more image sensors 314 have respective fields of view that overlap.

The mechanical stabilization system for the one or more image sensors 314 includes the gimbals and motors 316. The gimbals and motors 316 may be parts of a movement mechanism (e.g., the movement mechanism 30). The gimbals and motors 316 may connect the one or more image sensors 314 to a moving platform and control their orientation. For example, the image capture device 310 may include a drone that is coupled to a housing of the image sensor(s) 314 by the gimbals of the mechanical stabilization system. The gimbals and motors 316 may span multiple axes (e.g., a 3-axis gimbal set with brushless direct current motors). The mechanical stabilization system may include a controller (e.g., a proportional integral derivative (PID) controller). For example, the controller of the mechanical stabilization system may be implemented by the processing apparatus 312 (e.g., as a software module or a specialized hardware module).

The one or more motion sensors 318 are configured to detect motion of the one or more image sensors 314. For example, the one or more motion sensors 318 may include parts of an inertial measurement unit (e.g., including gyroscopes, accelerometers, and/or magnetometers) that is mounted in a housing with the one or more image sensors 314. In some implementations, the one or more motion sensors 318 may include parts of an inertial measurement unit that is mounted in a movable platform of the image capture device 310. In some implementations, the one or more motion sensors 318 includes sensors (e.g., magnetic encoders, optical encoders, and/or potentiometers) that detect the state of the gimbals and motors 316 to measure a relative orientation of the image sensor and a movable platform of the image capture device 310. For example, the one or more motion sensors 318 may include encoders configured to detect a position and orientation of the image sensor relative to a movable platform (e.g., a drone or a handheld battery base). The processing apparatus 312 may be configured to determine a sequence of orientation estimates based on sensor data from the one or more motion sensors 318. For example, determining the sequence of orientation estimates may include applying quadratic estimation to sensor data from a plurality of the one or more motion sensors 318.

The processing apparatus 312 may be configured to invoke the mechanical stabilization system and the electronic image stabilization module in combination to mitigate distortion of captured images due to motion of the image capture device 310. The processing apparatus 312 may be configured to determine a sequence of orientation estimates based on sensor data from the one or more motion sensors; determine an orientation setpoint for the image sensor; based on the sequence of orientation estimates and the orientation setpoint, invoke the mechanical stabilization system to adjust the orientation of the image sensor; receive the image from the image sensor; determine an orientation error between the orientation of the image sensor and the orientation setpoint during capture of the image; and, based on the orientation error, invoke the electronic image stabilization module to correct the image for a rotation corresponding to the orientation error to obtain a stabilized image. The processing apparatus 312 may be configured to store, display, or transmit an output image based on the stabilized image. In some implementations, the processing apparatus is configured to store a sequence of images captured after the image in a buffer; and determine the rotation corresponding to the orientation error based on orientation estimates from the sequence of orientation estimates corresponding to the sequence of images. For example, the processing apparatus 312 may be configured to determine a trajectory based on the sequence of orientation estimates corresponding to the sequence of images; and determine the rotation corresponding to the orientation error based on the trajectory. For example, the processing apparatus 312 may be configured to determine a sequence of orientation errors based on the sequence of orientation estimates corresponding to the sequence of images and the orientation setpoint; and apply a filter (e.g., a low-pass filter) to the sequence of orientation errors to obtain the trajectory. In some implementations, the image is captured with an electronic rolling shutter, the orientation error is a first orientation error associated with a first portion of the image, and the processing apparatus 312 is configured to determine a second orientation error between the orientation of the image sensor and the orientation setpoint during capture of a second portion of the image; an based on the second orientation error, invoke the electronic image stabilization module to correct the second portion of the image for a rotation corresponding to the second orientation error to obtain the stabilized image. For example, the processing apparatus 312 may be configured to implement the process 600 of FIG. 6 or the process 700 of FIG. 7.

The image capture device 310 may include a user interface 320. For example, the user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The image capture device 310 may include a communications interface 322, which may enable communications with a personal computing device (e.g., a smartphone, a tablet, a laptop computer, or a desktop computer). For example, the communications interface 322 may be used to receive commands controlling image capture and processing in the image capture device 310. For example, the communications interface 322 may be used to transfer image data to a personal computing device. For example, the communications interface 322 may include a wired interface, such as a high-definition multimedia interface (HDMI), a universal serial bus (USB) interface, or a FireWire interface. For example, the communications interface 322 may include a wireless interface, such as a Bluetooth interface, a ZigBee interface, and/or a Wi-Fi interface.

The image capture device 310 may include a battery 324 that powers the image capture device 310 and/or its peripherals. For example, the battery 324 may be charged wirelessly or through a micro-USB interface.

FIG. 3B is a block diagram of an example of a system 330 configured for image capture with image stabilization. The system 330 includes an image capture device 340 and a personal computing device 360 that communicate via a communications link 350. The image capture device 340 includes one or more image sensors 342 that are configured to capture images. The image capture device 340 includes a communications interface 348 configured to transfer images via the communication link 350 to the personal computing device 360. The personal computing device 360 includes a processing apparatus 362 that is configured to receive, using the communications interface 366, images from the one or more image sensors 342. The image capture device 340 includes gimbals and motors 344 that are actuators of a mechanical stabilization system configured to control an orientation of the one or more image sensors 342 (e.g., an orientation with respect to a movable platform). The gimbals and motors 344 may be controlled by a controller of the mechanical stabilization system, which may be implemented by the processing apparatus 362 (e.g., as a software module or a specialized hardware module) and provide control signals to the motors 344 via the communication link 350. The processing apparatus 362 may be configured to perform image signal processing (e.g., filtering, tone mapping, stitching, and/or encoding) to generate output images based on image data from the one or more image sensors 342. The processing apparatus 362 may include an electronic image stabilization module (e.g., implemented as a software module or a specialized hardware module) configured to correct images for rotations of the one or more image sensors 342. The image capture device 340 includes one or more motion sensors 346 configured to detect motion of the one or more image sensors 342. The one or more motion sensors 346 may provide feedback signals (e.g., via communication link 350) to the mechanical stabilization system and/or electronic image stabilization module. For example, the system 330 may be used to implement processes described in this disclosure, such as the process 600 of FIG. 6 and the process 700 of FIG. 7.

The one or more image sensors 342 are configured to capture images. The one or more image sensors 342 are configured to detect light of a certain spectrum (e.g., the visible spectrum or the infrared spectrum) and convey information constituting an image as electrical signals (e.g., analog or digital signals). For example, the one or more image sensors 342 may include charge-coupled devices (CCD) or active pixel sensors in complementary metal-oxide-semiconductor (CMOS). The one or more image sensors 342 may detect light incident through respective lens (e.g., a fisheye lens). In some implementations, the one or more image sensors 342 include digital to analog converters. In some implementations, the one or more image sensors 342 have respective fields of view that overlap.

The processing apparatus 362 may include one or more processors having single or multiple processing cores. The processing apparatus 362 may include memory, such as random access memory device (RAM), flash memory, or any other suitable type of storage device such as a non-transitory computer readable memory. The memory of the processing apparatus 362 may include executable instructions and data that can be accessed by one or more processors of the processing apparatus 362. For example, the processing apparatus 362 may include one or more DRAM modules such as double data rate synchronous dynamic random-access memory (DDR SDRAM). In some implementations, the processing apparatus 362 may include a digital signal processor (DSP). In some implementations, the processing apparatus 362 may include an application specific integrated circuit (ASIC). For example, the processing apparatus 362 may include a custom image signal processor.

The processing apparatus 362 may include an electronic image stabilization module configured to correct images for rotations of an image sensor. For example, the electronic image stabilization module may implemented by software executed by the processing apparatus 362. The electronic image stabilization module may take sensor data (e.g., gyroscope data) and/or orientation estimates for the image sensor as input, determine a corrective rotation, and apply the corrective rotation to an image from the image sensor to obtain a stabilized image.

The mechanical stabilization system for the one or more image sensors 342 includes the gimbals and motors 344. The gimbals and motors 344 may be parts of a movement mechanism (e.g., the movement mechanism 30). The gimbals and motors 344 may connect the one or more image sensors 342 to a moving platform and control their orientation. For example, the image capture device 340 may include a drone that is coupled to a housing of the image sensor(s) 342 by the gimbals of the mechanical stabilization system. The gimbals and motors 344 may span multiple axes (e.g., a 3-axis gimbal set with brushless direct current motors). The mechanical stabilization system may include a controller (e.g., a proportional integral derivative (PID) controller). For example, the controller of the mechanical stabilization system may be implemented by the processing apparatus 362 (e.g., as a software module or a specialized hardware module).

The one or more motion sensors 346 are configured to detect motion of the one or more image sensors 342. For example, the one or more motion sensors 346 may include parts of an inertial measurement unit (e.g., including gyroscopes, accelerometers, and/or magnetometers) that is mounted in a housing with the one or more image sensors 342. In some implementations, the one or more motion sensors 346 may include parts of an inertial measurement unit that is mounted in a movable platform of the image capture device 340. In some implementations, the one or more motion sensors 346 include sensors (e.g., magnetic encoders, optical encoders, and/or potentiometers) that detect the state of the gimbals and motors 344 to measure a relative orientation of the image sensor and a movable platform of the image capture device 340. For example, the one or more motion sensors 346 may include encoders configured to detect a position and orientation of the image sensor relative to a movable platform (e.g., a drone or a handheld battery base). The processing apparatus 362 may be configured to determine a sequence of orientation estimates based on sensor data from the one or more motion sensors 346. For example, determining the sequence of orientation estimates may include applying quadratic estimation to sensor data from a plurality of the one or more motion sensors 346.

The processing apparatus 362 may be configured to invoke the mechanical stabilization system and the electronic image stabilization module in combination to mitigate distortion of captured images due to motion of the image capture device 340. The processing apparatus 362 may be configured to determine a sequence of orientation estimates based on sensor data from the one or more motion sensors; determine an orientation setpoint for the image sensor; based on the sequence of orientation estimates and the orientation setpoint, invoke the mechanical stabilization system to adjust the orientation of the image sensor; receive the image from the image sensor; determine an orientation error between the orientation of the image sensor and the orientation setpoint during capture of the image; and, based on the orientation error, invoke the electronic image stabilization module to correct the image for a rotation corresponding to the orientation error to obtain a stabilized image. The processing apparatus 362 may be configured to store, display, or transmit an output image based on the stabilized image. In some implementations, the processing apparatus is configured to store a sequence of images captured after the image in a buffer; and determine the rotation corresponding to the orientation error based on orientation estimates from the sequence of orientation estimates corresponding to the sequence of images. For example, the processing apparatus 362 may be configured to determine a trajectory based on the sequence of orientation estimates corresponding to the sequence of images; and determine the rotation corresponding to the orientation error based on the trajectory. For example, the processing apparatus 362 may be configured to determine a sequence of orientation errors based on the sequence of orientation estimates corresponding to the sequence of images and the orientation setpoint; and apply a filter (e.g., a low-pass filter) to the sequence of orientation errors to obtain the trajectory. In some implementations, the image is captured with an electronic rolling shutter, the orientation error is a first orientation error associated with a first portion of the image, and the processing apparatus 362 is configured to determine a second orientation error between the orientation of the image sensor and the orientation setpoint during capture of a second portion of the image; an based on the second orientation error, invoke the electronic image stabilization module to correct the second portion of the image for a rotation corresponding to the second orientation error to obtain the stabilized image. For example, the processing apparatus 362 may be configured to implement the process 600 of FIG. 6 or the process 700 of FIG. 7.

The communications link 350 may be a wired communications link or a wireless communications link. The communications interface 348 and the communications interface 366 may enable communications over the communications link 350. For example, the communications interface 348 and the communications interface 366 may include a high-definition multimedia interface (HDMI), a universal serial bus (USB) interface, a FireWire interface, a Bluetooth interface, a ZigBee interface, and/or a Wi-Fi interface. For example, the communications interface 348 and the communications interface 366 may be used to transfer image data from the image capture device 340 to the personal computing device 360 for image signal processing (e.g., filtering, tone mapping, stitching, and/or encoding) to generate output images based on image data from the one or more image sensors 342. For example, the communications interface 348 and the communications interface 366 may be used to transfer motion sensor data from the image capture device 340 to the personal computing device 360 for processing in a controller of a mechanical stabilization system and or an electronic image stabilization system. For example, the communications interface 348 and the communications interface 366 may be used to transfer control signals to the image capture device 340 from the personal computing device 360 for controlling the gimbals and motors 344 of a mechanical stabilization system.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, snap photograph, or select tracking target) received via the user interface 364 may be passed on to the image capture device 340 via the communications link 350.

Figure 4:
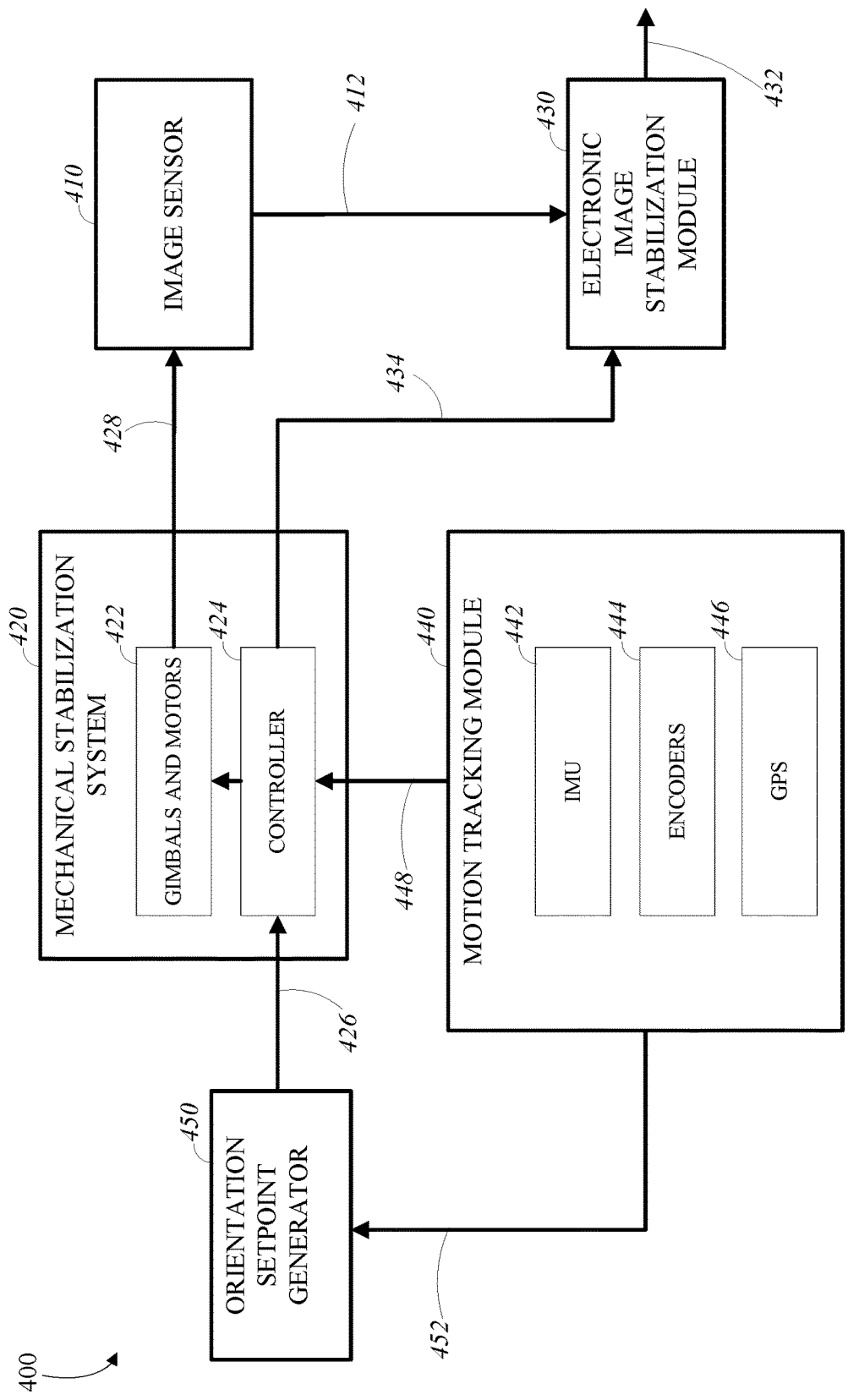
FIG. 4 is a block diagram of an example of a system configured for image capture with image stabilization.

FIG. 4 is a block diagram of an example of a system 400 configured for image capture with image stabilization. The system includes an image sensor 410 configured to capture an image; a mechanical stabilization system 420 configured to control an orientation of the image sensor 410; an electronic image stabilization module 430 configured to correct images for rotations of the image sensor; a motion tracking module 440 including one or more motion sensors configured to detect motion of the image sensor 410 and provide input to the mechanical stabilization system 420 and/or the electronic image stabilization module 430; and an orientation setpoint generator 450 configured to determine an orientation setpoint for the image sensor. The electronic image stabilization module 430 may be configured to correct an image for a rotation corresponding to the orientation error of the mechanical stabilization system 420 to obtain a stabilized image. For example, the system 400 may be used to implement processes described in this disclosure, such as the process 600 of FIG. 6 and the process 700 of FIG. 7.

The system 400 includes an image sensor 410 configured to capture an image 412. The image sensor 410 may be configured to detect light of a certain spectrum (e.g., the visible spectrum or the infrared spectrum) and convey information constituting an image as electrical signals (e.g., analog or digital signals). For example, the image sensor 410 may include charge-coupled devices (CCD) or active pixel sensors in complementary metal-oxide-semiconductor (CMOS). The image sensor 410 may detect light incident through a lens (e.g., a fisheye lens). In some implementations, the image sensor 410 includes a digital to analog converter.

The system 400 includes a mechanical stabilization system 420, including motors, configured to control an orientation of the image sensor 410 to match an orientation setpoint. In this example, the mechanical stabilization system 420 includes gimbals and motors 422 that are actuators used to control an orientation of the image sensor 410 (e.g., an orientation with respect to a movable platform). The gimbals and motors 422 may be parts of a movement mechanism (e.g., the movement mechanism 30). The gimbals and motors 422 may connect the image sensor 410 to a movable platform and control the orientation of the image sensor 410 with the movable platform. For example, the system 400 may include a drone (e.g., the movable platform 40) that is coupled to a housing of the image sensor 410 by the mechanical stabilization system 420. The gimbals and motors 422 may span multiple axes (e.g., a 3-axis gimbal set with brushless direct current motors). The mechanical stabilization system 420 may include a controller 424 (e.g., a proportional integral derivative (PID) controller). For example, the controller 424 of the mechanical stabilization system 420 may be implemented as a software module or a specialized hardware module (e.g., by the processing apparatus 312). The controller 424 may take an orientation setpoint 426 from the orientation setpoint generator 450, which may include a tracking system (e.g., the tracking system 60). The controller 424 may be configured to rejection motions that deviate from the orientation setpoint 426 (e.g., a current orientation). The gimbals and motors 422 are used to generate forces 428 (e.g., torques or displacements) to actuate control of an orientation and/or position of the image sensor 410. For example, the forces 428 may serve to keep the image sensor 410 pointed steadily at a target while a connected movable platform (e.g., a drone) is moving.

The system 400 includes an electronic image stabilization module 430 configured to correct images for rotations of the image sensor 410 corresponding to orientation errors 434 between the orientation of the image sensor 410 and the orientation setpoint 426 during capture of the image 412. For example, the electronic image stabilization module 430 may be implemented by software executed by a processing apparatus (e.g., an image signal processor). The electronic image stabilization module 430 may take orientation errors 434 as input, determine a corrective rotation, and apply the corrective rotation to the image 412 from the image sensor 410 to obtain a stabilized image 432. Correcting for rotations based on orientation error 434 fed forward from the mechanical stabilization system 420 may prevent or reduce interference between the dynamics of the mechanical stabilization system 420 and the dynamics of the electronic image stabilization module 430 and improve image quality of the stabilized image 432. For example, certain higher frequency motions of the image sensor 410 (e.g., vibrations) may be too fast to be efficiently rejected by the mechanical stabilization system 420 and thus may cause distortion of the image 412. This remaining distortion may be corrected in whole or in part by digital image processing in the electronic image stabilization module 430.

The system 400 includes a motion tracking module 440 including one or more motion sensors configured to detect motion of the image sensor 410 and determine a sequence of orientation estimates 448 for the image sensor 410. The motion tracking module 440 includes an inertial measurement unit 442 that can be used to detect changes in position and orientation of the image sensor 410. For example, the inertial measurement unit 442 may include a 3-axis accelerometer, a 3-axis gyroscope, and/or a 3-axis magnetometer. The motion tracking module 440 includes encoders 444 (e.g., magnetic encoders, optical encoders, and/or interferometric laser encoders) that can be used to detect a position and/or orientation of the image sensor 410 relative to a movable platform (e.g., a drone) connected by the gimbals and motors 422. The motion tracking module 440 includes a global positioning system (GPS) receiver 446 that can be used to track changes in a position of the image sensor 410. The motion tracking module 440 may include a sensor fusion module for combining data from the various sensors of the motion tracking module 440 to determine the sequence of estimates of the position and/or orientation of the image sensor 410. For example, determining the sequence of orientation estimates 448 may include applying quadratic estimation to sensor data from the inertial measurement unit 442, the encoders 444, and/or the GPS receiver 446. The mechanical stabilization system 420 may take the sequence of orientation estimates 448 as input and use the sequence of orientation estimates 448 as feedback for controlling the orientation of the image sensor 410.

The system 400 includes an orientation setpoint generator 450 for directing an orientation of the image sensor 410. The orientation setpoint generator 450 may determine an orientation setpoint 426 for the image sensor. The orientation setpoint 426 may be determined based on sensor data and/or orientation estimates 452 from the motion tracking module 440. In some implementations, the orientation setpoint 426 is determined to maintain a stable orientation (e.g., selected based on past orientation estimates for the image sensors 410). In some implementations, the orientation setpoint 426 is determined to track an object and keep it within a field of view of the image sensor 410. For example, the orientation setpoint generator 450 may include a tracking module (e.g., the tracking system 60) that is configured to track an object (e.g., a person). An object may be selected for tracking by a user. For example, an object may be tracked using computer vision techniques and/or beacon signals from the object. The orientation setpoint 426 may be updated periodically (e.g., at the frame rate, at half the frame rate, or at ten times the frame rate for the image sensor 410). The orientation setpoint 426 may specify an orientation and/or a position of the image sensor 410. For example, the orientation setpoint 426 may include a quaternion. In some implementations, the orientation setpoint 426 may specify twelve degrees of freedom (e.g., three angles, three angular velocities, three position coordinates, and three velocities). For example, the orientation setpoint generator 450 may be implemented as software executed by a processing apparatus (e.g., the processing apparatus 312).

Figure 5:
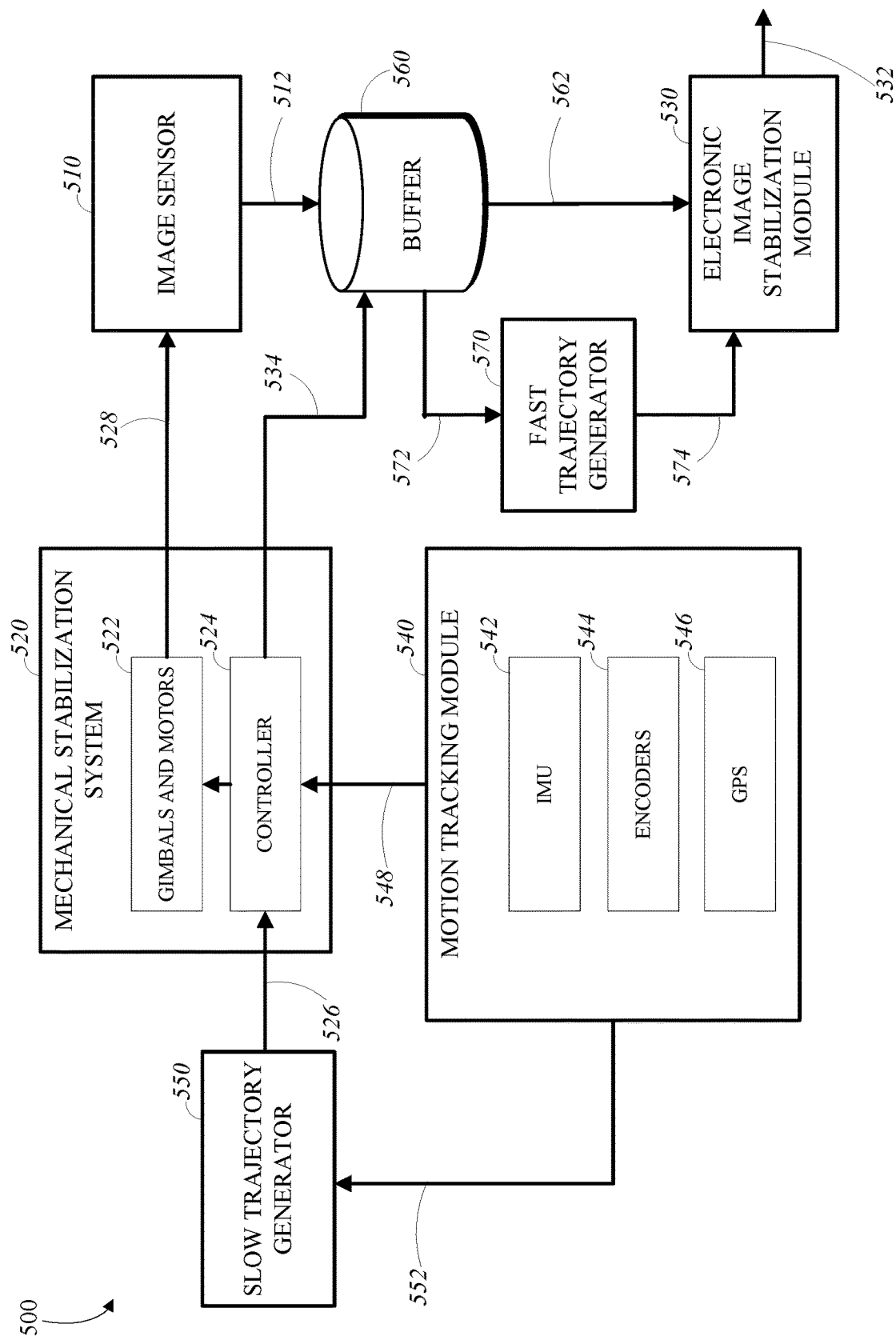
FIG. 5 is a block diagram of an example of a system configured for image capture with image stabilization.

FIG. 5 is a block diagram of an example of a system 500 configured for image capture with image stabilization. The system includes an image sensor 510 configured to capture an image; a mechanical stabilization system 520 configured to control an orientation of the image sensor 510; an electronic image stabilization module 530 configured to correct images for rotations of the image sensor; a motion tracking module 540 including one or more motion sensors configured to detect motion of the image sensor 510 and provide input to the mechanical stabilization system 520 and/or the electronic image stabilization module 530; a slow trajectory generator 550 configured to determine a sequence of orientation setpoints 526 for the image sensor; a buffer 560 for storing a sequence of images; and a fast trajectory generator 570 configured to determine a sequence of rotations 574 for correction by the electronic image stabilization module 530 based on orientation errors 572 for the sequence of images stored in the buffer 560. The electronic image stabilization module 530 may be configured to correct an image for a rotation 574 from the fast trajectory generator 570 corresponding to the orientation error of the mechanical stabilization system 520 to obtain a stabilized image. Storing a sequence of images (e.g., frames of video) in the buffer 560 may provide processing delay to enable non-causal, look-ahead filtering to determine a smoother sequence of rotations 574 for correction by the electronic image stabilization module 530, which may improve quality of the resulting stabilized image 532. For example, the system 500 may be used to implement processes described in this disclosure, such as the process 700 of FIG. 7.

The system 500 includes an image sensor 510 configured to capture an image 512. The image sensor 510 may be configured to detect light of a certain spectrum (e.g., the visible spectrum or the infrared spectrum) and convey information constituting an image as electrical signals (e.g., analog or digital signals). For example, the image sensor 510 may include charge-coupled devices (CCD) or active pixel sensors in complementary metal-oxide-semiconductor (CMOS). The image sensor 510 may detect light incident through a lens (e.g., a fisheye lens). In some implementations, the image sensor 510 includes a digital to analog converter.

The system 500 includes a mechanical stabilization system 520, including motors, configured to control an orientation of the image sensor 510 to match an orientation setpoint. In this example, the mechanical stabilization system 520 includes gimbals and motors 522 that are actuators used to control an orientation of the image sensor 510 (e.g., an orientation with respect to a movable platform). The gimbals and motors 522 may be parts of a movement mechanism (e.g., the movement mechanism 30). The gimbals and motors 522 may connect the image sensor 510 to a movable platform and control the orientation of the image sensor 510 with the movable platform. For example, the system 500 may include a drone (e.g., the movable platform 40) that is coupled to a housing of the image sensor 510 by the mechanical stabilization system 520. The gimbals and motors 522 may span multiple axes (e.g., a 3-axis gimbal set with brushless direct current motors). The mechanical stabilization system 520 may include a controller 524 (e.g., a proportional integral derivative (PID) controller). For example, the controller 524 of the mechanical stabilization system 520 may be implemented as a software module or a specialized hardware module (e.g., by the processing apparatus 312). The controller 524 may take an orientation setpoint 526 from the slow trajectory generator 550, which may include a tracking system (e.g., the tracking system 60). The controller 524 may be configured to rejection motions that deviate from the orientation setpoint 526 (e.g., a current orientation). The gimbals and motors 522 are used to generate forces 528 (e.g., torques or displacements) to actuate control of an orientation and/or position of the image sensor 510. For example, the forces 528 may serve to keep the image sensor 510 pointed steadily at a target while a connected movable platform (e.g., a drone) is moving.

The system 500 includes an electronic image stabilization module 530 configured to correct images for rotations of the image sensor 510 corresponding to orientation errors 534 between the orientation of the image sensor 510 and the orientation setpoint 526 during capture of an image 512. For example, the electronic image stabilization module 530 may be implemented by software executed by a processing apparatus (e.g., an image signal processor). The electronic image stabilization module 530 may take rotations 574 from the fast trajectory generator 570 as input, determine a corrective rotation, and apply the corrective rotation to an image 562 from the buffer 560 (e.g., the oldest image in a sequence of images stored in the buffer 560) to obtain a stabilized image 532. Correcting for rotations based on orientation errors 572 fed forward from the mechanical stabilization system 520 may prevent or reduce interference between the dynamics of the mechanical stabilization system 520 and the dynamics of the electronic image stabilization module 530 and improve image quality of the stabilized image 532. For example, certain higher frequency motions of the image sensor 510 (e.g., vibrations) may be too fast to be efficiently rejected by the mechanical stabilization system 520 and thus may cause distortion of the image 562. This remaining distortion may be corrected in whole or in part by digital image processing in the electronic image stabilization module 530.

The system 500 includes a motion tracking module 540 including one or more motion sensors configured to detect motion of the image sensor 510 and determine a sequence of orientation estimates 548 for the image sensor 510. The motion tracking module 540 includes an inertial measurement unit 542 that can be used to detect changes in position and orientation of the image sensor 510. For example, the inertial measurement unit 542 may include a 3-axis accelerometer, a 3-axis gyroscope, and/or a 3-axis magnetometer. The motion tracking module 540 includes encoders 544 (e.g., magnetic encoders, optical encoders, and/or interferometric laser encoders) that can be used to detect a position and/or orientation of the image sensor 510 relative to a movable platform (e.g., a drone) connected by the gimbals and motors 522. The motion tracking module 540 includes a global positioning system (GPS) receiver 546 that can be used to track changes in a position of the image sensor 510. The motion tracking module 540 may include a sensor fusion module for combining data from the various sensors of the motion tracking module 540 to determine the sequence of estimates of the position and/or orientation of the image sensor 510. For example, determining the sequence of orientation estimates 548 may include applying quadratic estimation to sensor data from the inertial measurement unit 542, the encoders 544, and/or the GPS receiver 546. The mechanical stabilization system 520 may take the sequence of orientation estimates 548 as input and use the sequence of orientation estimates 548 as feedback for controlling the orientation of the image sensor 510.

The system 500 includes a slow trajectory generator 550 for directing an orientation of the image sensor 510. The slow trajectory generator 550 may determine a sequence of orientation setpoints 526 that specify a desired trajectory for the image sensor 510. The orientation setpoints 526 may be determined based on sensor data and/or orientation estimates 552 from the motion tracking module 540. In some implementations, the sequence of orientation setpoints 526 is determined to maintain a stable orientation (e.g., selected based on past orientation estimates for the image sensor 510). In some implementations, the sequence of orientation setpoints 526 is determined to track an object and keep it within a field of view of the image sensor 510. For example, the slow trajectory generator 550 may include a tracking module (e.g., the tracking system 60) that is configured to track an object (e.g., a person). An object may be selected for tracking by a user (e.g., via a touchscreen user interface). For example, an object may be tracked using computer vision techniques and/or beacon signals from the object. The orientation setpoint 526 may be updated periodically (e.g., at the frame rate, at half the frame rate, or at ten times the frame rate for the image sensor 510). The orientation setpoint 526 may specify an orientation and/or a position of the image sensor 510. For example, the orientation setpoint 526 may include a quaternion. In some implementations, the orientation setpoint 526 may specify twelve degrees of freedom (e.g., three angles, three angular velocities, three position coordinates, and three velocities). For example, the slow trajectory generator 550 may be implemented as software executed by a processing apparatus (e.g., the processing apparatus 312).

The system 500 includes a buffer 560 to store a sequence of images (e.g., frames of video) captured by the image sensor 510. For example, the buffer 560 may be a circular buffer that stores the most recent images that have been captured in a sequence over a fixed period of time (e.g., a buffer of the last 0.5, 1, or 2 seconds of video frames). For example, a new image 512 may be written over an oldest image stored in the buffer 560 after that oldest image has been processed by the electronic image stabilization module 530. The buffer 560 may also receive an orientation error 534 corresponding to a new image 512 that is stored in the buffer 560 along with the image 512.

The system 500 includes a fast trajectory generator 570 configured to determine a sequence of rotations 574 based on orientation errors 572 corresponding to images in the buffer 560. A sequence of orientation errors 572 associated with the sequence of images stored in the buffer 560 may be accessed by the fast trajectory generator 570. For example, a low-pass filter may be applied to the sequence of orientation errors 572 to determine the sequence of rotations 574 to be corrected. The fast trajectory generator 570 may also consider orientation errors for older images in the sequence of images that have previously been processed by the electronic image stabilization module 530 and deleted from the buffer 560 when determining the sequence of rotations 574 including a rotation for an image 562 that is about to be processed by the electronic image stabilization module 530. For example, the electronic image stabilization module 530 may be configured to use a rotation from the sequence of rotations 574 corresponding to an oldest image 562 stored in the buffer 560.

Figure 6:
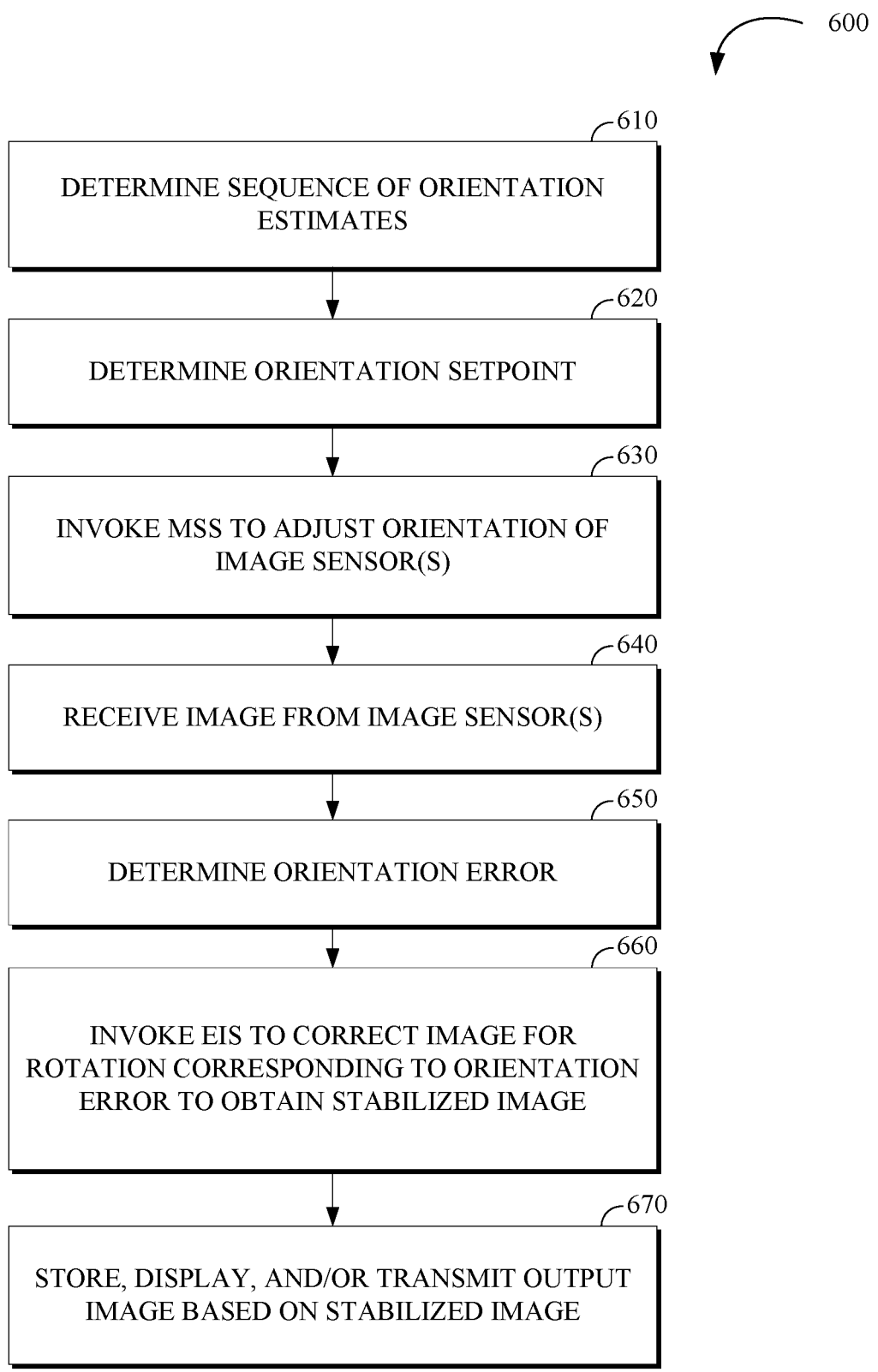
FIG. 6 is a flowchart of an example of a process for image capture with mechanical and electronic image stabilization.

FIG. 6 is a flowchart of an example of a process 600 for image capture with mechanical and electronic image stabilization. The process 600 includes determining 610 a sequence of orientation estimates based on sensor data from one or more motion sensors; determining 620 an orientation setpoint for an image sensor; based on the sequence of orientation estimates for the image sensor and the orientation setpoint, invoking 630 a mechanical stabilization system to adjust an orientation of the image sensor toward the orientation setpoint; receiving 640 an image from the image sensor; determining 650 an orientation error between the orientation of the image sensor and the orientation setpoint during capture of the image; based on the orientation error, invoking 660 an electronic image stabilization module to correct the image for a rotation corresponding to the orientation error to obtain a stabilized image; and storing, displaying, or transmitting 670 an output image based on the stabilized image. For example, the process 600 may be implemented by the movable imaging system 10 of FIG. 1, the system 300 of FIG. 3A, the system 330 of FIG. 3B, or the system 400 of FIG. 4. For example, the process 600 may be implemented by an image capture device, such the image capture device 310 shown in FIG. 3A. For example, the process 600 may be implemented by a personal computing device, such as the personal computing device 360.

The process 600 includes determining 610 a sequence of orientation estimates based on sensor data from one or more motion sensors (e.g., the one or more motion sensors 318). The one or more motion sensors may include an inertial measurement unit (e.g., the inertial measurement unit 442) that can be used to detect changes in position and orientation of the image sensor. The one or more motion sensors may include encoders (e.g., magnetic encoders, optical encoders, and/or interferometric laser encoders) that can be used to detect a position and/or orientation of the image sensor relative to movable platform (e.g., a drone) connected by the gimbals and motors of the mechanical stabilization system. The one or more motion sensors may include potentiometers that detect a state of the gimbals and motors and thus a position and/or orientation of the image sensor relative to a movable platform (e.g., a drone) connected by the gimbals and motors. Data from the one or more motion sensors may be combined to determine 610 the sequence of estimates of the orientation of the image sensor. For example, determining 610 the sequence of orientation estimates may include applying quadratic estimation to sensor data from the one or more motion sensors. In some implementations, an orientation estimate of the sequence of orientation estimates may include an estimate of the orientation of the image sensor with respect to gravity or a horizon. For example, sensor measurements from an inertial measurement unit may be used to estimate an orientation of the images sensor with respect to gravity. In some implementations, an orientation estimate of the sequence of orientation estimates may include an estimate of the orientation of the image sensor with respect to a movable platform (e.g., a drone or a handheld). In some implementations, the sequence of orientation estimates includes an estimate of orientation of the image sensor with respect to a movable platform and an estimate of orientation of the image sensor with respect to gravity.

The process 600 includes determining 620 an orientation setpoint for an image sensor. The orientation setpoint may be determined 620 based on sensor data and/or orientation estimates reflecting an orientation and/or a position of the image sensor. In some implementations, the orientation setpoint is determined 620 to maintain a stable orientation (e.g., selected based on past orientation estimates for the image sensor). For example, a recent orientation estimate or an average of recent orientation estimates may be used to determine 620 the orientation setpoint in an effort to keep the image sensor steady in the presence of vibrations or other motion of an attached movable platform (e.g., a drone). In some implementations, the orientation setpoint is determined 620 to track an object and keep it within a field of view of the image sensor. For example, a tracking module (e.g., the tracking system 60) that is configured to track an object (e.g., a person) may be invoked to determine 620 the orientation setpoint. An object may be selected for tracking by a user. For example, an object may be tracked using computer vision techniques and/or beacon signals from the object. The orientation setpoint may be determined 620 periodically (e.g., at the frame rate, at half the frame rate, or at ten times a frame rate for the image sensor). The orientation setpoint may specify an orientation and/or a position of the image sensor. For example, the orientation setpoint may include a quaternion. In some implementations, the orientation setpoint may specify twelve degrees of freedom (e.g., three angles, three angular velocities, three position coordinates, and three velocities). For example, the orientation setpoint may be determined 620 using software executed by a processing apparatus (e.g., the processing apparatus 312).

The process 600 includes, based on a sequence of orientation estimates for the image sensor and the orientation setpoint, invoking 630 a mechanical stabilization system (e.g., the mechanical stabilization system 420) to adjust an orientation of the image sensor toward the orientation setpoint. For example, the mechanical stabilization system may include gimbals and motors (e.g., the gimbals and motors 316) controlled by proportional integral derivative (PID) controllers. For example, the mechanical stabilization system may be invoked 630 by calling and/or executing a software implementation of a controller of the mechanical stabilization system and causing it to process input data, based on the sequence of orientation estimates, to generate control signals to drive actuators (e.g., the gimbals and motors 316) to control the orientation and/or position of the image sensor. For example, the mechanical stabilization system may be invoked 630 by inputting data, based on the sequence of orientation estimates and the orientation setpoint, to a specialized hardware implementation of a controller of the mechanical stabilization system and causing it to process the input data to generate control signals to drive actuators (e.g., the gimbals and motors 316) to control the orientation and/or position of the image sensor. Invoking 630 the mechanical stabilization system may reduce undesired motion of the image sensor and associated distortions (e.g., blurring and shaking between frames of video).

The process 600 includes receiving 640 an image from the image sensor. The image sensor may be part of an image capture system (e.g., the movable imaging system 10, the image capture device 310, or the image capture device 340). In some implementations, the image sensor may be attached to a processing apparatus that implements the process 600. For example, the image may be received 640 from the image sensor via a bus. In some implementations, the image may be received 640 via a communications link (e.g., the communications link 350). For example, the image may be received 640 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image may be received 640 via communications interface 366. For example, the image may be received 640 as an input image signal, which may represent each pixel value in a defined format, such as in a RAW image format. In some implementations, the image may be frame of video, i.e., one of a sequence of images of a video. In some implementations, the image is received 640 directly from the image sensor without intermediate image processing. In some implementations, the image is received 640 after being subjected to intermediate image processing (e.g., correction of dead pixels, band processing, decoupling of vertical blanking, spatial noise reduction, and/or temporal noise reduction).

The process 600 includes determining 650 an orientation error between the orientation of the image sensor and the orientation setpoint during capture of the image. The orientation error may be determined 650 as a relative orientation or rotation (e.g., stored as quaternion) that relates the orientation setpoint to an orientation estimate for the image sensor during capture of the image. In some implementations, an electronic rolling shutter is used by the image sensor to capture the image and multiple orientation errors may be determined 650 for respective portions of image (e.g., rows of pixels) that are captured at slightly different times. For example, a first orientation error associated with a first portion of the image and a second orientation error associated with a second portion of the image may be determined 650.

The process 600 includes, based on the orientation error, invoking 660 the electronic image stabilization module (e.g., the electronic image stabilization module 430) to correct the image for a rotation corresponding to the orientation error to obtain a stabilized image. For example, the electronic image stabilization module may be invoked 660 by calling and/or executing a software implementation of the electronic image stabilization module and causing it to process input data, corresponding to the orientation error, to determine and apply a corrective rotation transformation to the image from the image sensor to stabilize the image (e.g., with respect to other images in sequence of frames of video). For example, the electronic image stabilization module may be invoked 660 by inputting data, based on the sequence of orientation estimates and the orientation setpoint, to a specialized hardware implementation of the electronic image stabilization module and causing it to process the input data to determine and apply a corrective rotation transformation to the image from the image sensor to stabilize the image. In some implementations, the rotation corrected by electronic image stabilization module is the orientation error or an inverse of the orientation error. For example, the rotation corrected by the electronic image stabilization module may be interpolated from a sequence of orientation errors for respective images in a sequence of images (e.g., previous frames of video). In some implementations, the image is captured with an electronic rolling shutter and there are multiple orientation errors for respective portions of the image (e.g., a first orientation error associated with a first portion of the image and a second orientation error associated with a second portion of the image) that are captured at different times. For example, a second orientation error between the orientation of the image sensor and the orientation setpoint during capture of a second portion of the image may be determined and, based on the second orientation error, the electronic image stabilization module may be invoked 660 to correct the second portion of the image for a rotation corresponding to the second orientation error to obtain the stabilized image.

Correcting the image for a rotation corresponding to the orientation error may prevent or reduce interference between the dynamics of the mechanical stabilization system and the dynamics of the electronic image stabilization module and improve image quality of the stabilized image. For example, certain higher frequency motions of the image sensor (e.g., vibrations) may be too fast to be efficiently rejected by the mechanical stabilization system and thus may cause distortion of the image. This remaining distortion may be corrected in whole or in part by digital image processing in the electronic image stabilization module.

The process 600 includes storing, displaying, or transmitting 670 an output image based on the stabilized image. In some implementations, the output image is the stabilized image. In some implementations, the stabilized image may by subject to additional image processing (e.g., perceptual tone mapping, lens distortion correction, electronic rolling shutter correction, stitching with parallax correction and blending to combine images from multiple image sensors, and/or output projection) to determine the output image. For example, the output image may be transmitted 670 to an external device (e.g., a personal computing device) for display or storage. For example, the output image may be stored 670 in memory of a processing apparatus (e.g., the processing apparatus 312 or the processing apparatus 362). For example, the output image may be displayed 670 in the user interface 320 or in the user interface 364. For example, the output image may be transmitted 670 via the communications interface 322.

Figure 7:
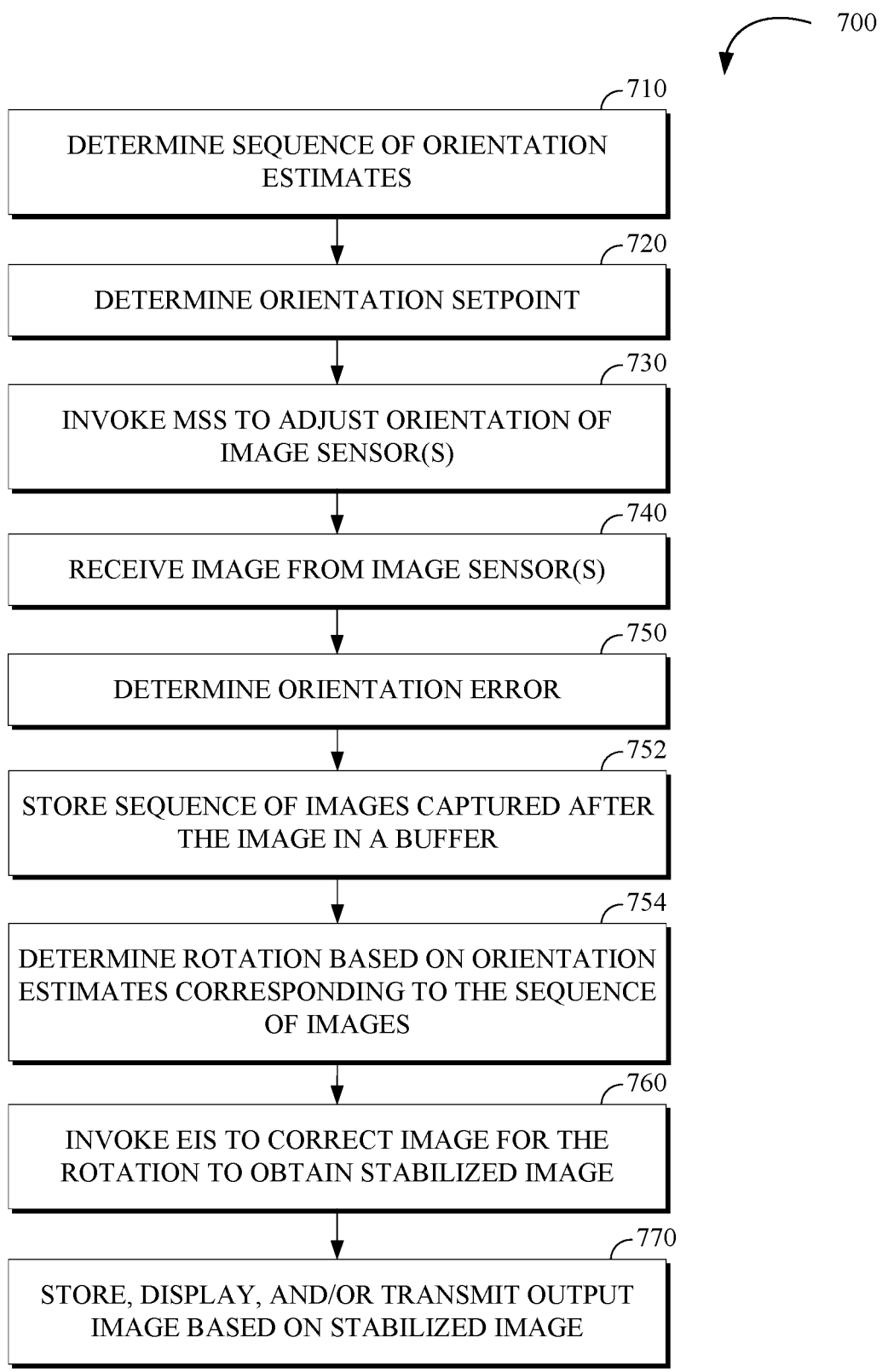
FIG. 7 is a flowchart of an example of a process for image capture with mechanical and electronic image stabilization.

FIG. 7 is a flowchart of an example of a process 700 for image capture with mechanical and electronic image stabilization. The process 700 includes determining 710 a sequence of orientation estimates based on sensor data from one or more motion sensors; determining 720 an orientation setpoint for an image sensor; based on the sequence of orientation estimates for the image sensor and the orientation setpoint, invoking 730 a mechanical stabilization system to adjust an orientation of the image sensor toward the orientation setpoint; receiving 740 an image from the image sensor; determining 750 an orientation error between the orientation of the image sensor and the orientation setpoint during capture of the image; storing 752 a sequence of images captured after the image in a buffer; determining 754 a rotation corresponding to the orientation error based on orientation estimates from the sequence of orientation estimates corresponding to the sequence of images; based on the orientation error, invoking 760 an electronic image stabilization module to correct the image for the rotation to obtain a stabilized image; and storing, displaying, or transmitting 770 an output image based on the stabilized image. Storing a sequence of images (e.g., frames of video) in a buffer may provide processing delay to enable non-causal, look-ahead filtering to determine a smoother sequence of rotations for correction by the electronic image stabilization module, which may improve quality of the resulting stabilized images. For example, the process 700 may be implemented by the movable imaging system 10 of FIG. 1, the system 300 of FIG. 3A, the system 330 of FIG. 3B, or the system 400 of FIG. 4. For example, the process 700 may be implemented by an image capture device, such the image capture device 310 shown in FIG. 3A. For example, the process 700 may be implemented by a personal computing device, such as the personal computing device 360.

The process 700 includes determining 710 a sequence of orientation estimates based on sensor data from one or more motion sensors (e.g., the one or more motion sensors 318). The one or more motion sensors may include an inertial measurement unit (e.g., the inertial measurement unit 442) that can be used to detect changes in position and orientation of the image sensor. The one or more motion sensors may include encoders (e.g., magnetic encoders, optical encoders, and/or interferometric laser encoders) that can be used to detect a position and/or orientation of the image sensor relative to movable platform (e.g., a drone) connected by the gimbals and motors of the mechanical stabilization system. The one or more motion sensors may include potentiometers that detect a state of the gimbals and motors and thus a position and/or orientation of the image sensor relative to a movable platform (e.g., a drone) connected by the gimbals and motors. Data from the one or more motion sensors may be combined to determine 710 the sequence of estimates of the orientation of the image sensor. For example, determining 710 the sequence of orientation estimates may include applying quadratic estimation to sensor data from the one or more motion sensors. In some implementations, an orientation estimate of the sequence of orientation estimates may include an estimate of the orientation of the image sensor with respect to gravity or a horizon. For example, sensor measurements from an inertial measurement unit may be used to estimate an orientation of the images sensor with respect to gravity. In some implementations, an orientation estimate of the sequence of orientation estimates may include an estimate of the orientation of the image sensor with respect to a movable platform (e.g., a drone or a handheld). In some implementations, the sequence of orientation estimates includes an estimate of orientation of the image sensor with respect to a movable platform and an estimate of orientation of the image sensor with respect to gravity.

The process 700 includes determining 720 an orientation setpoint for an image sensor. The orientation setpoint may be determined 720 based on sensor data and/or orientation estimates reflecting an orientation and/or a position of the image sensor. In some implementations, the orientation setpoint is determined 720 to maintain a stable orientation (e.g., selected based on past orientation estimates for the image sensor). For example, a recent orientation estimate or an average of recent orientation estimates may be used to determine 720 the orientation setpoint in an effort to keep the image sensor steady in the presence of vibrations or other motion of an attached movable platform (e.g., a drone). In some implementations, the orientation setpoint is determined 720 to track an object and keep it within a field of view of the image sensor. For example, a tracking module (e.g., the tracking system 60) that is configured to track an object (e.g., a person) may be invoked to determine 720 the orientation setpoint. An object may be selected for tracking by a user. For example, an object may be tracked using computer vision techniques and/or beacon signals from the object. The orientation setpoint may be determined 720 periodically (e.g., at the frame rate, at half the frame rate, or at ten times a frame rate for the image sensor). The orientation setpoint may specify an orientation and/or a position of the image sensor. For example, the orientation setpoint may include a quaternion. In some implementations, the orientation setpoint may specify twelve degrees of freedom (e.g., three angles, three angular velocities, three position coordinates, and three velocities). For example, the orientation setpoint may be determined 720 using software executed by a processing apparatus (e.g., the processing apparatus 312).

The process 700 includes, based on a sequence of orientation estimates for the image sensor and the orientation setpoint, invoking 730 a mechanical stabilization system (e.g., the mechanical stabilization system 420) to adjust an orientation of the image sensor toward the orientation setpoint. For example, the mechanical stabilization system may include gimbals and motors (e.g., the gimbals and motors 316) controlled by proportional integral derivative (PID) controllers. For example, the mechanical stabilization system may be invoked 730 by calling and/or executing a software implementation of a controller of the mechanical stabilization system and causing it to process input data, based on the sequence of orientation estimates, to generate control signals to drive actuators (e.g., the gimbals and motors 316) to control the orientation and/or position of the image sensor. For example, the mechanical stabilization system may be invoked 730 by inputting data, based on the sequence of orientation estimates and the orientation setpoint, to a specialized hardware implementation of a controller of the mechanical stabilization system and causing it to process the input data to generate control signals to drive actuators (e.g., the gimbals and motors 316) to control the orientation and/or position of the image sensor. Invoking 730 the mechanical stabilization system may reduce undesired motion of the image sensor and associated distortions (e.g., blurring and shaking between frames of video).

The process 700 includes receiving 740 an image from the image sensor. The image sensor may be part of an image capture system (e.g., the movable imaging system 10, the image capture device 310, or the image capture device 340). In some implementations, the image sensor may be attached to a processing apparatus that implements the process 700. For example, the image may be received 740 from the image sensor via a bus. In some implementations, the image may be received 740 via a communications link (e.g., the communications link 350). For example, the image may be received 740 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image may be received 740 via communications interface 366. For example, the image may be received 740 as an input image signal, which may represent each pixel value in a defined format, such as in a RAW image format. In some implementations, the image may be frame of video, i.e., one of a sequence of images of a video. In some implementations, the image is received 740 directly from the image sensor without intermediate image processing. In some implementations, the image is received 740 after being subjected to intermediate image processing (e.g., correction of dead pixels, band processing, decoupling of vertical blanking, spatial noise reduction, and/or temporal noise reduction).

The process 700 includes determining 750 an orientation error between the orientation of the image sensor and the orientation setpoint during capture of the image. The orientation error may be determined 750 as a relative orientation or rotation (e.g., stored as quaternion) that relates the orientation setpoint to an orientation estimate for the image sensor during capture of the image. In some implementations, an electronic rolling shutter is used by the image sensor to capture the image and multiple orientation errors may be determined 750 for respective portions of image (e.g., rows of pixels) that are captured at slightly different times. For example, a first orientation error associated with a first portion of the image and a second orientation error associated with a second portion of the image may be determined 750.

The process 700 includes storing 752 a sequence of images captured after the image in a buffer (e.g., the buffer 560). The buffer may provide processing delay to enable non-causal, look-ahead filtering to determine a smoother sequence of rotations for correction by the electronic image stabilization module. For example, the buffer may be a circular buffer that stores the most recent images that have been captured in a sequence over a fixed period of time (e.g., a buffer of the last 0.5, 1, or 2 seconds of video frames). For example, when a new image is captured, the new image may be written over an oldest image stored in the buffer after that oldest image has been processed by the electronic image stabilization module. The buffer may also store an orientation error and/or an orientation estimate corresponding to a new image that is stored in the buffer along with the image.

The process 700 includes determining 754 the rotation corresponding to the orientation error based on orientation estimates from the sequence of orientation estimates corresponding to the sequence of images. For example, the rotation for an oldest image stored in the buffer may be determined 754 as a rotation in a smoothed sequence of rotations (e.g., a trajectory) that is determined based on a sequence of orientation estimates and/or respective orientation errors corresponding to a sequence of images including the sequence of newer images stored in the buffer. In some implementations, determining 754 the rotation includes determining a trajectory (e.g., a sequence of EIS rotations) based on the sequence of orientation estimates corresponding to the sequence of images; and determining the rotation corresponding to the orientation error based on the trajectory. For example, determining the trajectory may include determining a sequence of orientation errors based on the sequence of orientation estimates corresponding to the sequence of images and the orientation setpoint and applying a filter (e.g., a low-pass filter) to the sequence of orientation errors to obtain the trajectory. For example, the process 800 of FIG. 8 may be implemented to determine 754 the rotation corresponding to the orientation error.

The process 700 includes, based on the orientation error, invoking 760 the electronic image stabilization module (e.g., the electronic image stabilization module 430) to correct the image for a rotation corresponding to the orientation error to obtain a stabilized image. For example, the electronic image stabilization module may be invoked 760 by calling and/or executing a software implementation of the electronic image stabilization module and causing it to process input data, corresponding to the orientation error, to determine and apply a corrective rotation transformation to the image from the image sensor to stabilize the image (e.g., with respect to other images in sequence of frames of video). For example, the electronic image stabilization module may be invoked 760 by inputting data, based on the sequence of orientation estimates and the orientation setpoint, to a specialized hardware implementation of the electronic image stabilization module and causing it to process the input data to determine and apply a corrective rotation transformation to the image from the image sensor to stabilize the image. In some implementations, the rotation corrected by electronic image stabilization module is the orientation error or an inverse of the orientation error. For example, the rotation corrected by the electronic image stabilization module may be interpolated from a sequence of orientation errors for respective images in a sequence of images (e.g., previous frames of video). In some implementations, the image is captured with an electronic rolling shutter and there are multiple orientation errors for respective portions of the image (e.g., a first orientation error associated with a first portion of the image and a second orientation error associated with a second portion of the image) that are captured at different times. For example, a second orientation error between the orientation of the image sensor and the orientation setpoint during capture of a second portion of the image may be determined and, based on the second orientation error, the electronic image stabilization module may be invoked 760 to correct the second portion of the image for a rotation corresponding to the second orientation error to obtain the stabilized image.

Correcting the image for a rotation corresponding to the orientation error may prevent or reduce interference between the dynamics of the mechanical stabilization system and the dynamics of the electronic image stabilization module and improve image quality of the stabilized image. For example, certain higher frequency motions of the image sensor (e.g., vibrations) may be too fast to be efficiently rejected by the mechanical stabilization system and thus may cause distortion of the image. This remaining distortion may be corrected in whole or in part by digital image processing in the electronic image stabilization module.

The process 700 includes storing, displaying, or transmitting 770 an output image based on the stabilized image. In some implementations, the output image is the stabilized image. In some implementations, the stabilized image may by subject to additional image processing (e.g., perceptual tone mapping, lens distortion correction, electronic rolling shutter correction, stitching with parallax correction and blending to combine images from multiple image sensors, and/or output projection) to determine the output image. For example, the output image may be transmitted 770 to an external device (e.g., a personal computing device) for display or storage. For example, the output image may be stored 770 in memory of a processing apparatus (e.g., the processing apparatus 312 or the processing apparatus 362). For example, the output image may be displayed 770 in the user interface 320 or in the user interface 364. For example, the output image may be transmitted 770 via the communications interface 322.

Figure 8:
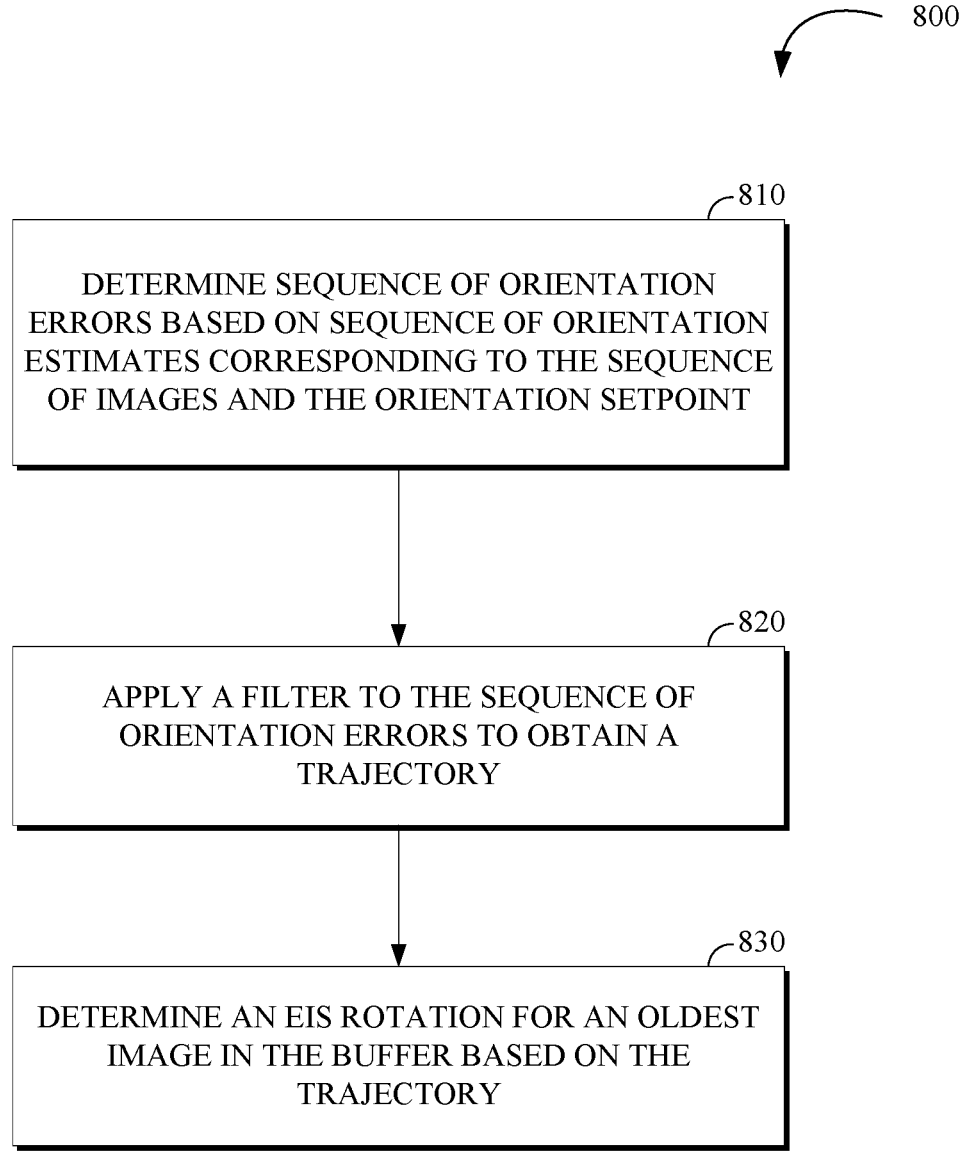
FIG. 8 is a flowchart of an example of a process for determining a rotation based on a sequence of orientation estimates for a sequence of images.

FIG. 8 is a flowchart of an example of a process 800 for determining a rotation based on a sequence of orientation estimates for a sequence of images. The process 800 includes determining 810 a sequence of orientation errors based on a sequence of orientation estimates corresponding to a sequence of images and an orientation setpoint; applying 820 a filter to the sequence of orientation errors to obtain the trajectory; and determining 830 the rotation corresponding to an orientation error for an image in the sequence of images based on the trajectory. For example, the process 800 may be implemented by the movable imaging system 10 of FIG. 1, the system 300 of FIG. 3A, the system 330 of FIG. 3B, or the system 400 of FIG. 4. For example, the process 800 may be implemented by an image capture device, such the image capture device 310 shown in FIG. 3A. For example, the process 800 may be implemented by a personal computing device, such as the personal computing device 360.

The process 800 includes determining 810 a sequence of orientation errors based on a sequence of orientation estimates corresponding to a sequence of images (e.g., frames of video) and an orientation setpoint. The orientation setpoint may be the same for all images in the sequence of images or the orientation setpoint may change between images in the sequence of images. An orientation estimate for an image may be combined with a corresponding orientation setpoint to determine an orientation error for the image at any time between capture of the image and the use of the orientation error to determine an EIS rotation. In some implementations, orientation estimates for respective images in the sequence of images are stored separately from one or more corresponding values of the orientation setpoint while the corresponding images are stored in the buffer and awaiting EIS processing. An orientation error for an image in the sequence of images may then be determined 810 when it is needed (e.g., by the fast trajectory generator 570). In some implementations, orientation errors for respective images in the sequence of images are determined 810 at the time of capture and stored in the buffer with corresponding images awaiting EIS processing.

The process 800 includes applying 820 a filter to the sequence of orientation errors to obtain the trajectory (e.g., a sequence of EIS rotations). For example, a low-pass filter may be applied 820 in order to smooth or interpolate the sequence of orientation errors to obtain the trajectory. For example, the low-pass filter may include a Hamming window centered at the orientation error corresponding to an image currently being processed by the electronic image stabilization module, which may be the oldest image stored in the buffer.

The process 800 includes determining 830 the rotation corresponding to the orientation error based on the trajectory. For example, the rotation may be determined 830 as rotation or an inverse of a rotation from the trajectory that corresponds to an image currently being processed by the electronic image stabilization module, which may be the oldest image stored in the buffer.

It should be noted that the processes described in relation to FIGS. 6-7 and similar processes may be applied to multiple images from different image sensors of an image capture apparatus (e.g., the movable imaging assembly 20 shown in FIG. 1, the system 300 of FIG. 3A, or the system 330 of FIG. 3B). The resulting stabilized images may be combined using a stitching operation.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
   an image sensor;
   one or more motion sensors configured to detect motion of the image sensor;
   a mechanical stabilization system configured to control an orientation of the image sensor;
   an electronic image stabilization module configured to correct images for motion of the image sensor; and
   a processing apparatus that is configured to:
      based on sensor data from the one or more motion sensors and an orientation setpoint for the image sensor, invoke the mechanical stabilization system to adjust the orientation of the image sensor;
      receive an image from the image sensor;
      store a sequence of images captured after the image in a buffer;
      determine an orientation error between the orientation of the image sensor and the orientation setpoint during capture of the image;
      determine a rotation corresponding to the orientation error based on a sequence of orientation estimates corresponding to the sequence of images, wherein the orientation estimates are based on sensor data from the one or more motion sensors; and
      based on the orientation error, invoke the electronic image stabilization module to correct the image to obtain a stabilized image, in which the electronic image stabilization module corrects the image for the rotation corresponding to the orientation error.

2. The system of claim 1, further comprising:
   a drone that is coupled to a housing of the image sensor by the mechanical stabilization system.

3. The system of claim 1, in which the processing apparatus is further configured to:
   determine a trajectory based on the sequence of orientation estimates corresponding to the sequence of images; and
   determine the rotation corresponding to the orientation error based on the trajectory.

4. The system of claim 3, in which the processing apparatus is further configured to:
   determine a sequence of orientation errors based on the sequence of orientation estimates corresponding to the sequence of images and the orientation setpoint; and
   apply a filter to the sequence of orientation errors to obtain the trajectory.

5. The system of claim 1, in which the image is captured with an electronic rolling shutter, the orientation error is a first orientation error associated with a first portion of the image, and the processing apparatus is further configured to:
   determine a second orientation error between the orientation of the image sensor and the orientation setpoint during capture of a second portion of the image; and
   based on the second orientation error, invoke the electronic image stabilization module to correct the second portion of the image for a rotation corresponding to the second orientation error to obtain the stabilized image.

6. The system of claim 1, in which the one or more motion sensors include encoders configured to detect a position and an orientation of the image sensor relative to a movable platform.

7. The system of claim 1, in which the orientation setpoint includes a quaternion.

8. The system of claim 1, in which the electronic image stabilization module is implemented by software executed by the processing apparatus.

9. A method comprising:
   based on a sequence of orientation estimates for an image sensor and an orientation setpoint, invoking a mechanical stabilization system to adjust an orientation of the image sensor toward the orientation setpoint;
   receiving an image from the image sensor;
   storing a sequence of images captured after the image in a buffer;
   determining an orientation error between the orientation of the image sensor and the orientation setpoint during capture of the image;
   determining a rotation corresponding to the orientation error based on orientation estimates from the sequence of orientation estimates corresponding to the sequence of images; and
   based on the orientation error, invoking an electronic image stabilization module to correct the image to obtain a stabilized image, in which the electronic image stabilization module corrects the image for the rotation corresponding to the orientation error.

10. The method of claim 9, further comprising:
    determining a trajectory based on the sequence of orientation estimates corresponding to the sequence of images; and
    determining the rotation corresponding to the orientation error based on the trajectory.

11. The method of claim 10, further comprising:
    determining a sequence of orientation errors based on the sequence of orientation estimates corresponding to the sequence of images and the orientation setpoint; and
    applying a filter to the sequence of orientation errors to obtain the trajectory.

12. The method of claim 9, in which the image is captured with an electronic rolling shutter, the orientation error is a first orientation error associated with a first portion of the image, and further comprising:
    determining a second orientation error between the orientation of the image sensor and the orientation setpoint during capture of a second portion of the image; and
    based on the second orientation error, invoking the electronic image stabilization module to correct the second portion of the image for a rotation corresponding to the second orientation error to obtain the stabilized image.

13. The method of claim 9, in which an orientation in the sequence of orientation estimates includes an estimate of orientation of the image sensor with respect to a movable platform and an estimate of orientation of the image sensor with respect to gravity.

14. The method of claim 9, in which the mechanical stabilization system includes gimbals and motors controlled by proportional integral derivative controllers.

15. A system comprising:
an image sensor configured to capture an image;
a mechanical stabilization system configured to control an orientation of the image sensor to match an orientation setpoint;
an electronic image stabilization module configured to correct the image for motion of the image sensor corresponding to orientation errors between the orientation of the image sensor and the orientation setpoint during capture of the image;
a buffer configured to store a sequence of images captured by the image sensor;
a fast trajectory generator configured to determine a sequence of rotations based on orientation errors corresponding to images in the buffer, wherein the electronic image stabilization module is configured to use a rotation from the sequence of rotations corresponding to an oldest image stored in the buffer; and
a drone that is coupled to a housing of the image sensor by the mechanical stabilization system.

16. The system of claim 15, in which the mechanical stabilization system includes gimbals and motors controlled by proportional integral derivative controllers.

17. The system of claim 15, further comprising:
a motion tracking module including one or more motion sensors configured to detect motion of the image sensor and determine a sequence of orientation estimates for the image sensor, wherein the mechanical stabilization system is configured to take the sequence of orientation estimates as input and use the sequence of orientation estimates as feedback for controlling the orientation of the image sensor.

18. The system of claim 17, in which the fast trajectory generator is configured to:
determine a trajectory based on orientation estimates from the sequence of orientation estimates corresponding to the sequence of images; and
determine the rotation from the sequence of rotations corresponding to the oldest image stored in the buffer based on the trajectory.

19. The system of claim 18, in which the fast trajectory generator is configured to:
determine a sequence of orientation errors based on the orientation setpoint and the orientation estimates from the sequence of orientation estimates corresponding to the sequence of images; and
apply a filter to the sequence of orientation errors to obtain the trajectory.

20. The system of claim 15, in which the orientation setpoint includes a quaternion.

* * * * *